US012223865B2

(12) United States Patent
Su

(10) Patent No.: US 12,223,865 B2
(45) Date of Patent: Feb. 11, 2025

(54) DISPLAY DRIVING CIRCUIT AND METHOD FOR TESTING DRIVERS THEREOF

(71) Applicant: SITRONIX TECHNOLOGY CORP., Hsinchu County (TW)

(72) Inventor: Chung-Hsin Su, Hsinchu County (TW)

(73) Assignee: SITRONIX TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/225,880

(22) Filed: Jul. 25, 2023

(65) Prior Publication Data

US 2024/0029603 A1 Jan. 25, 2024

Related U.S. Application Data

(60) Provisional application No. 63/358,315, filed on Jul. 25, 2022.

(51) Int. Cl.
*G09G 3/00* (2006.01)
*G09G 3/3208* (2016.01)

(52) U.S. Cl.
CPC ........... *G09G 3/006* (2013.01); *G09G 3/3208* (2013.01); *G09G 2330/12* (2013.01)

(58) Field of Classification Search
CPC ... G09G 2330/12; G09G 3/006; G09G 3/3208
See application file for complete search history.

(56) References Cited

U.S. PATENT DOCUMENTS

| | | | | |
|---|---|---|---|---|
| 8,848,007 B2 * | 9/2014 | Lee | G09G 3/3208 345/84 |
| 9,870,725 B2 * | 1/2018 | Lin | G06F 3/14 |
| 11,341,875 B2 * | 5/2022 | Lee | G09G 3/035 |
| 2011/0109536 A1 * | 5/2011 | Huang | G09G 3/3696 345/99 |
| 2019/0340965 A1 * | 11/2019 | Chang | G09G 3/006 |
| 2021/0012691 A1 * | 1/2021 | Hu | G09G 3/3677 |
| 2023/0401996 A1 * | 12/2023 | Su | G09G 3/32 |

* cited by examiner

*Primary Examiner* — Chun-Nan Lin
(74) *Attorney, Agent, or Firm* — WPAT, PC

(57) ABSTRACT

The present application provides a display driving circuit and a method for testing drivers thereof, which is applied to a control circuit for testing a first and a second driver connected in series. The control circuit transmits an enable signal, a first voltage level, and a second voltage level to the first driver for comparing a first returned voltage level and a second returned voltage level of the first driver with a first preset parameter and a second preset parameter. When the first returned voltage level is not equal to the first preset parameter or the second returned voltage level is not equal to the second preset parameter, the control circuit stops testing. Thereby, by using the voltage levels transmitted between the control circuit and the drivers, built-in self-tests may be performed, which simplifies the self-tests of the display driving circuit and no external testing device is required.

19 Claims, 17 Drawing Sheets

DISPLAY DRIVING CIRCUIT AND METHOD FOR TESTING DRIVERS THEREOF

FIELD OF THE INVENTION

The present application is related to a display driving circuit and a method for testing drivers thereof, particularly a display driving circuit applied for a display panel and a method for testing drivers thereof.

BACKGROUND OF THE INVENTION

With the gradual progress of the times, light-emitting diodes (LEDs) are gradually used in display devices, and the initial application is backlight modules of TFT-LCDs.

TFT-LCD was originally a non-self-illuminating flat-panel display, and its display mode is similar to a light control switch, requiring a backlight module to provide a light source.

Since TFT-LCD began to flourish in the 1990s, some manufacturers used LEDs as the backlight of liquid crystal displays. Using LEDs as the backlight has the characteristics of high color saturation, power saving, and thinness. However, due to high panel manufacturing cost, poor heat dissipation, and low photoelectric efficiency, they have not been widely used in TFT-LCD products.

In the 2000s, white LEDs made by encapsulating blue LED chips in phosphor-containing resins had gradually matured in terms of manufacturing process, performance, and cost. In the 2010s, white LED backlight modules (LED backlight modules) appeared explosive growth has completely replaced the traditional CCFL backlight modules within a few years. Its application fields range from mobile phones, tablet computers, notebook computers, desktop monitors, and even TVs and public signage.

In recent years, the resolution provided by the display panel has been continuously improved. That is to say, the number of pixels per unit area inside the display panel has been increased, and the area occupied by each pixel has been continuously reduced due to the increase in the number of pixels.

Increasing the number of pixels leads to the limited area of each pixel so that the number of circuit elements that may be accommodated in each pixel inside the display panel is limited by the area corresponding to each pixel.

Consequently, the current technology simplifies the circuits located in the pixels, which also simplifies the functions that may be completed by the circuits located in the pixels. For example, it is used in active-matrix organic light-emitting diodes AMOLED), micro LED micron-scale light-emitting diodes and other display panel driver chips.

In order to ensure that the driver is coupled to the circuit in the pixel, the data line of the driver will be tested before leaving the factory. The common part of the test is usually carried out with a test machine, and the driver test and screening are completed according to the test results provided by the test machine.

However, such a driver test may only ensure that the display driver has passed the test and screening at the factory and no real-time test of the display panel may be performed when it is in use, which is the so-called built-in self-test (BIST). Built-in self-test is a mechanism that allows devices to self-test, and it is also a technology for implementing testability design. One of the purposes is to simplify product complexity, thereby reducing costs and reducing dependence on external test equipment.

To allow the display panel to perform a built-in self-test on the internal driver, the solution according to the prior art is to add a test circuit inside the display panel and use the test circuit to perform a built-in self-test on the driver inside the display panel. However, a problem caused by the additive testing circuit with the built-in self-test is the internal space of the display panel occupied by the additive testing circuit. Further, the overall circuit layout should be changed according to different requirements for the self-test method.

Accordingly, how to perform a self-test on the display panel only by using the original circuit without adding new circuits is a problem to be solved by the technical staffs in the art.

SUMMARY OF THE INVENTION

An objective of the present application is to provide a display driving circuit and a method for testing drivers. The control circuit transmits voltage levels sequentially to the drivers for performing built-in self-tests according to the returned voltage level from the drivers to accomplish the self-tests without setting any additional test circuit.

To achieve the above objective, the present application provides a display driving circuit, which comprises a control circuit, a first driver, and a second driver. The control circuit includes a first preset parameter and a second preset parameter. The first driver and the second driver are connected in series and coupled to the control circuit. The control circuit generates an enable signal to the first driver for driving the first driver and second driver sequentially to test. The control circuit transmits a first voltage level and/or a second voltage level to the first driver to enable the first driver to return a first returned voltage level and/or a second returned voltage level to the control circuit. The control circuit compares the first returned voltage level and/or the second returned voltage level according to the first preset parameter and/or the second preset parameter. When the first returned voltage level is not equal to the first preset parameter or the second returned voltage level is not equal to the second preset parameter, the control circuit stops testing the second driver. Thereby, the display driver circuit may complete self-tests without any additional testing circuit.

According to another embodiment of the present application, furthermore, when the first returned voltage level is equal to the first preset parameter and the second returned voltage level is equal to the second preset parameter, the first driver transmits the enable signal to the second driver and the control circuit transmits the first voltage level and the second voltage level to the second driver for testing the second driver.

The present application further provides a method for testing a plurality of drivers connected in series applicable to a control circuit for testing a first driver and a second driver sequentially. The first driver and the second driver are connected in series. The control circuit transmits an enable signal to the first driver and the second driver for driving the plurality of drivers to perform self-tests sequentially. The testing method comprises steps of: the control circuit testing the first driver according to a first voltage level and/or a second voltage level so that the control circuit may compare a first returned voltage level and/or a second returned voltage level according to a first preset parameter and/or a second preset parameter; and when the first returned voltage level is not equal to the first preset parameter or the second returned voltage level is not equal to the second preset parameter, the control circuit stops testing the next driver.

Thereby, the display driver circuit may complete self-tests without any additional testing circuit.

According to another embodiment of the present application, furthermore, when the first returned voltage level is equal to the first preset parameter and the second returned voltage level is equal to the second preset parameter, the first driver transmits the enable signal to the second driver and the control circuit transmits the first voltage level and/or the second voltage level to the second driver for testing the second driver.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

In the specifications and subsequent claims, certain words are used for representing specific devices. A person having ordinary skills in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via another device or connecting means indirectly.

When the drivers of the existing display panel perform self-tests, a new test circuit is added inside the display panel, and the test circuit is used to perform built-in self-tests on the drivers inside the display panel. However, the problem caused by the new circuit is that it occupies the internal space of the display panel. Hence, the overall circuit layout should be changed according to the self-test method.

The present application provides a display driving circuit and the method for testing the drivers thereof. By equipping the original circuit with a testing module, self-tests may be performed on the display panel, thereby saving circuit layout area and reducing the use of external testing equipment.

In the following description, various embodiments of the present application are described using figures for describing the present application in detail. Nonetheless, the concepts of the present application may be embodied in various forms. Those embodiments are not used to limit the scope and range of the present application.

Figure 1A:
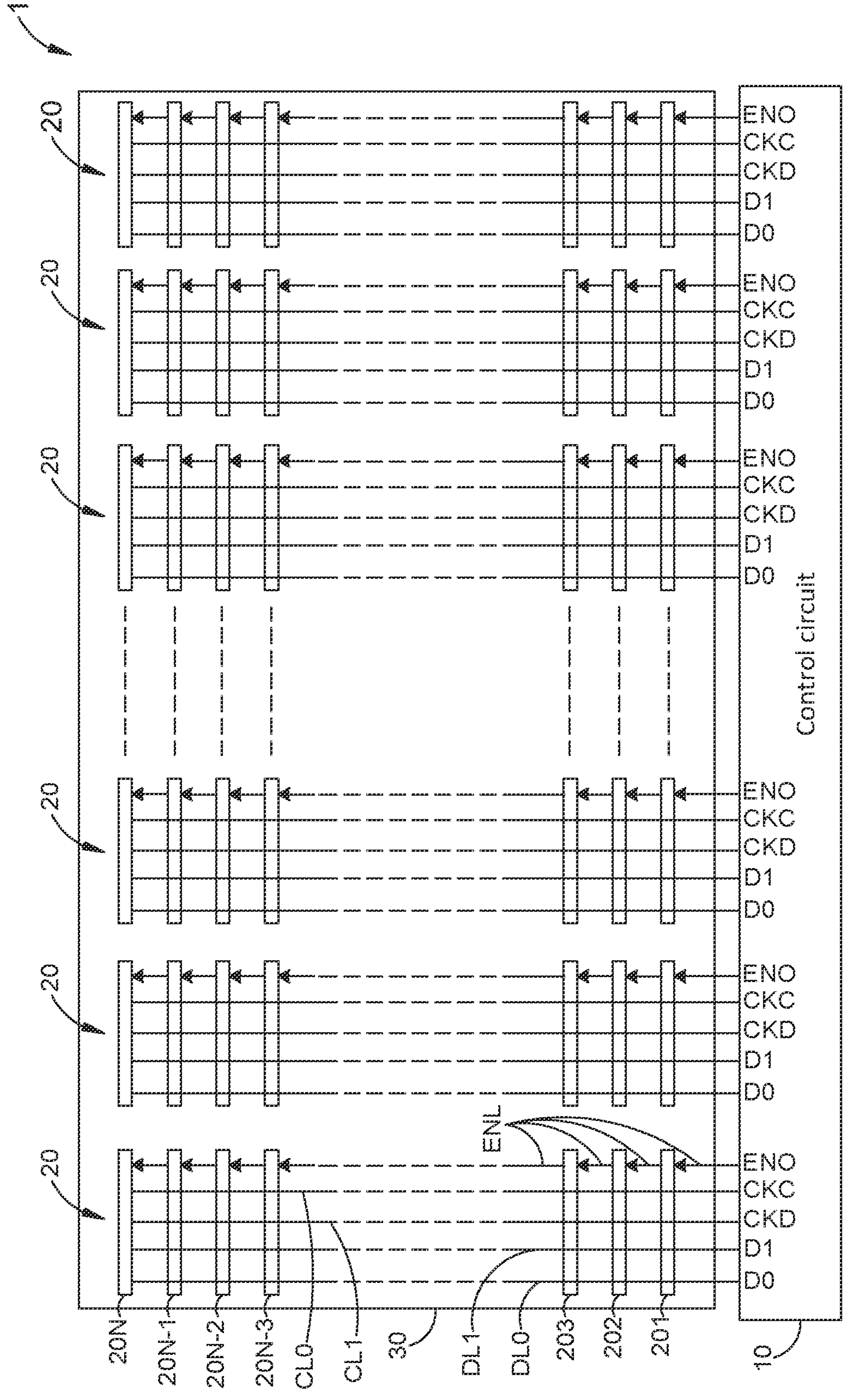
FIG. 1A shows a circuit diagram of the display driving circuit according to the first embodiment of the present application.

Please refer to FIG. 1A, which shows a circuit diagram of the display driving circuit according to the first embodiment of the present application. As shown in the figure, according to the first embodiment of the present application, a display driving circuit 1 comprises a control circuit 10 and a plurality of driver rows 20. The control circuit 10 is coupled to the driver rows 20. Each driver row 20 includes a plurality of (for example, N) drivers 201~20N connected in series. A first data node D0 of the control circuit 10 is coupled to a data line DL0, and a second data node D1 of the control circuit 10 is coupled to a second data line DL1; a control clock node CKC of the control circuit 10 is coupled to a first clock line CL0, and a data clock node CKD of the control circuit 10 is coupled to a second clock line CL1. An enable output node ENO of the control circuit 10 is coupled to an enable line ENL. The first data line DL0, the second data line DL1, the first clock line CL0, and the second clock line CL1 according to the present embodiment are connected in series with the plurality of drivers 201~20N. Enable lines ENL are connected between the plurality of drivers 201~20N according to the present embodiment. The control circuit 10 is coupled to the first driver 201 via the enable line ENL.

Figure 1B:
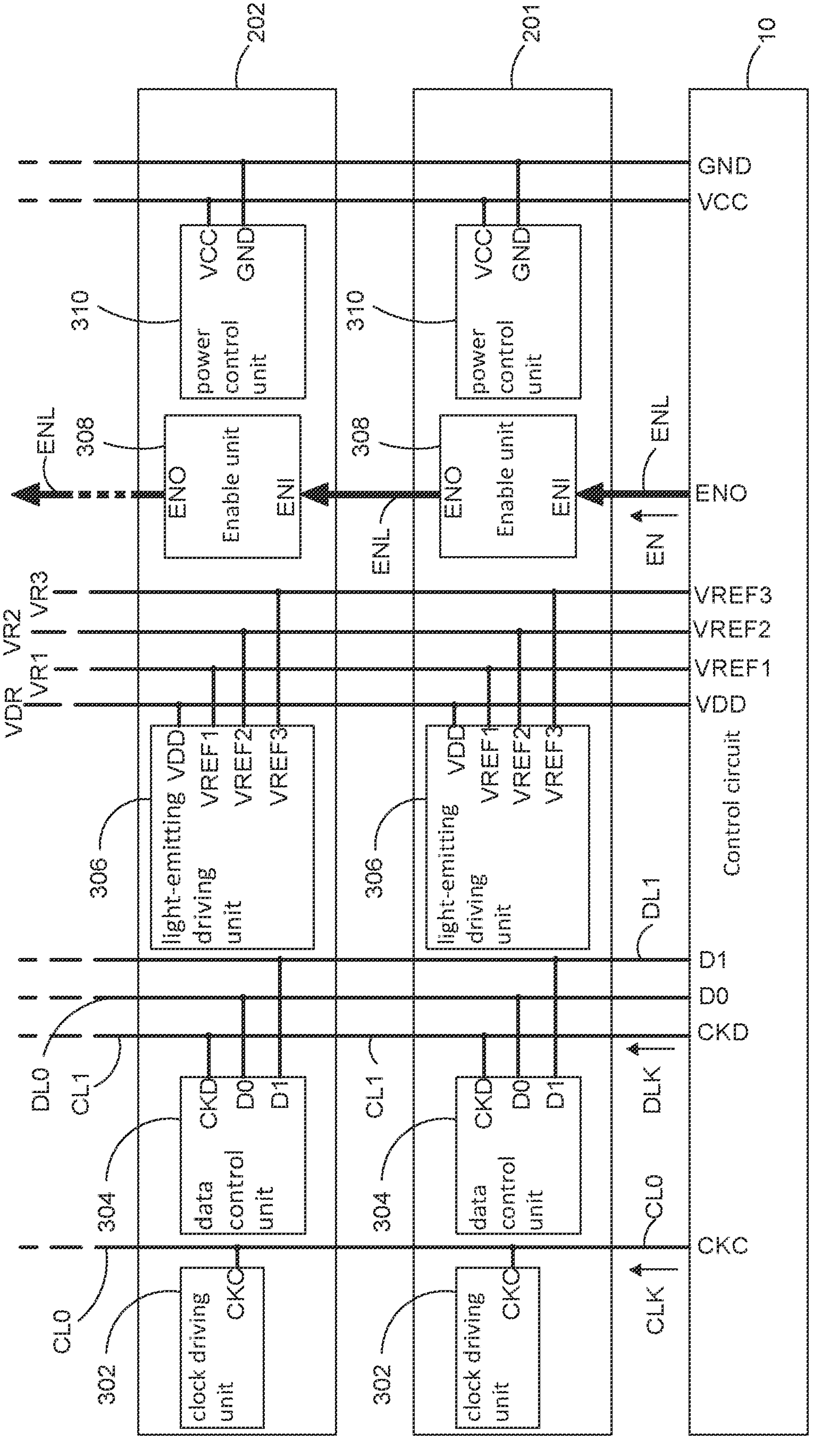
FIG. 1B shows a partial circuit diagram of the display driving circuit according to the first embodiment of the present application.

Please further refer to FIG. 1B, which shows a partial circuit diagram of the display driving circuit according to the first embodiment of the present application. As shown in the figure, according to the circuit diagram shown in FIG. 1A, the first driver 201, the second driver 202, and the coupled control circuit 10 are taken as an example The first driver 201 and the second driver 202 include a clock driving unit 302, a data control unit 304, a light-emitting driving unit 306, an enable unit 308, and a power control unit 310, respectively. The control clock node CKC of the clock driving unit 302 is coupled to the control circuit 10 via the first clock line CL0 for receiving a clock control signal CLK. The data clock node CKD, the first data node DO, and a second data node D1 of the data control unit 304 are coupled to the control circuit 10 via the second clock line CL1, the first data line DL0, and the second data line DL1. The data control unit 304 receives the data clock signal DLK via the second clock line CL1. The data clock signal DLK is used for controlling the driver rows 20 to drive a display device (not shown in the figure) of the display panel 30, such as driving AMOLED, mini LED, or micro LED, to display.

The light-emitting driving unit 306 is coupled to a driving voltage node VDD, a first reference voltage node VREF1, a second reference voltage node VREF2, and a third reference voltage node VREF3 of the control circuit 10 for receiving a driving voltage VDR, a first reference voltage VR1, a second reference voltage VR2, and a third reference voltage VR3 of the control circuit 10. Each enable unit 308 includes an enable input node ENI and an enable output node ENO. The enable input node ENI of the first driver 201 is coupled to the enable output node ENO of the control circuit 10. The enable input node ENI of the second driver 202 is coupled to the enable output node ENO of the first driver 201. The enable output node ENO of the second driver 202 is coupled to the enable input node ENI of the next driver, and so on, to the Nth driver 20N. Each power control unit 310 is coupled to a supply voltage node VCC and a ground GND of the control circuit 10.

Figure 1C:
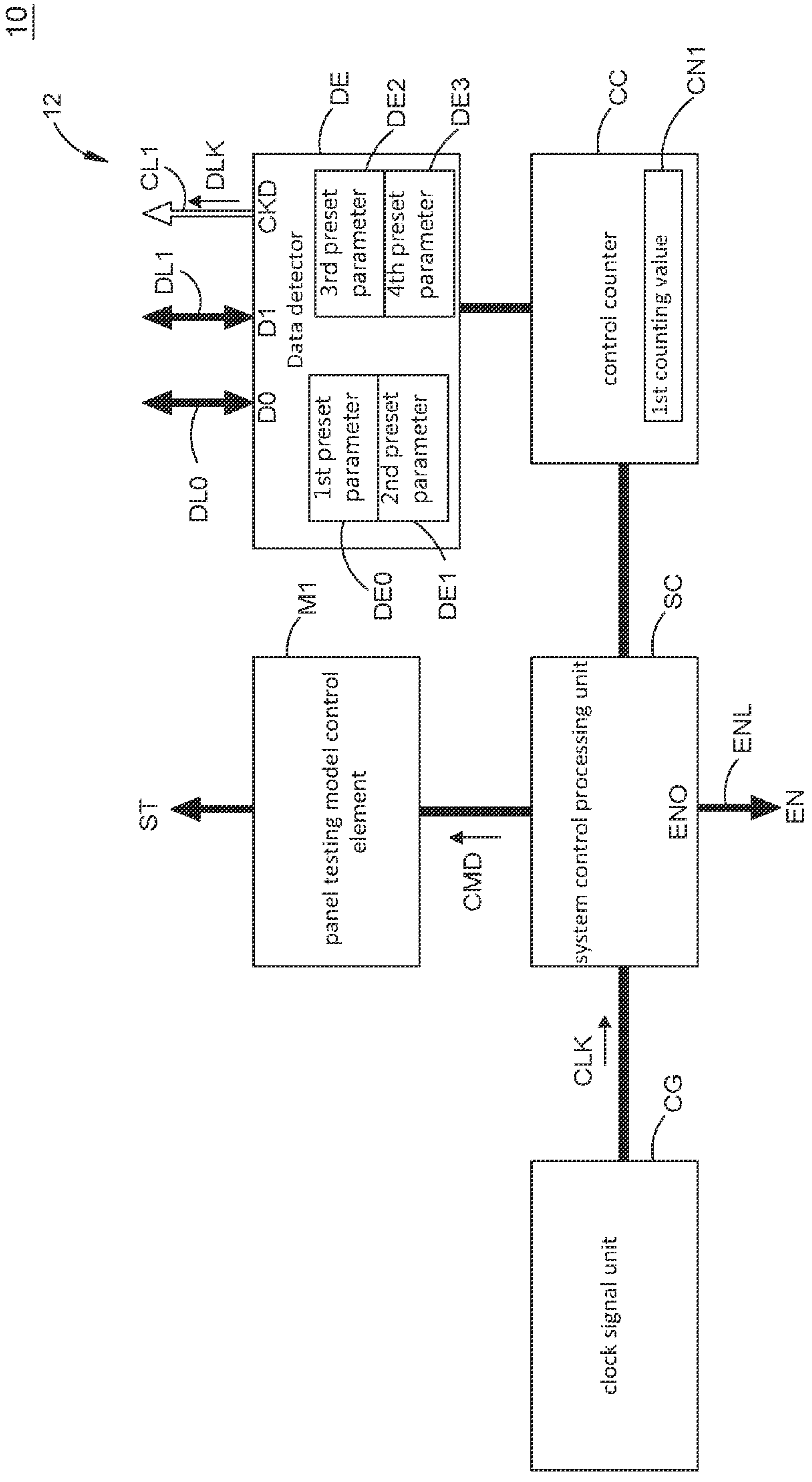
FIG. 1C shows a block diagram of the control circuit according to the first embodiment of the present application.
Figure 1D:
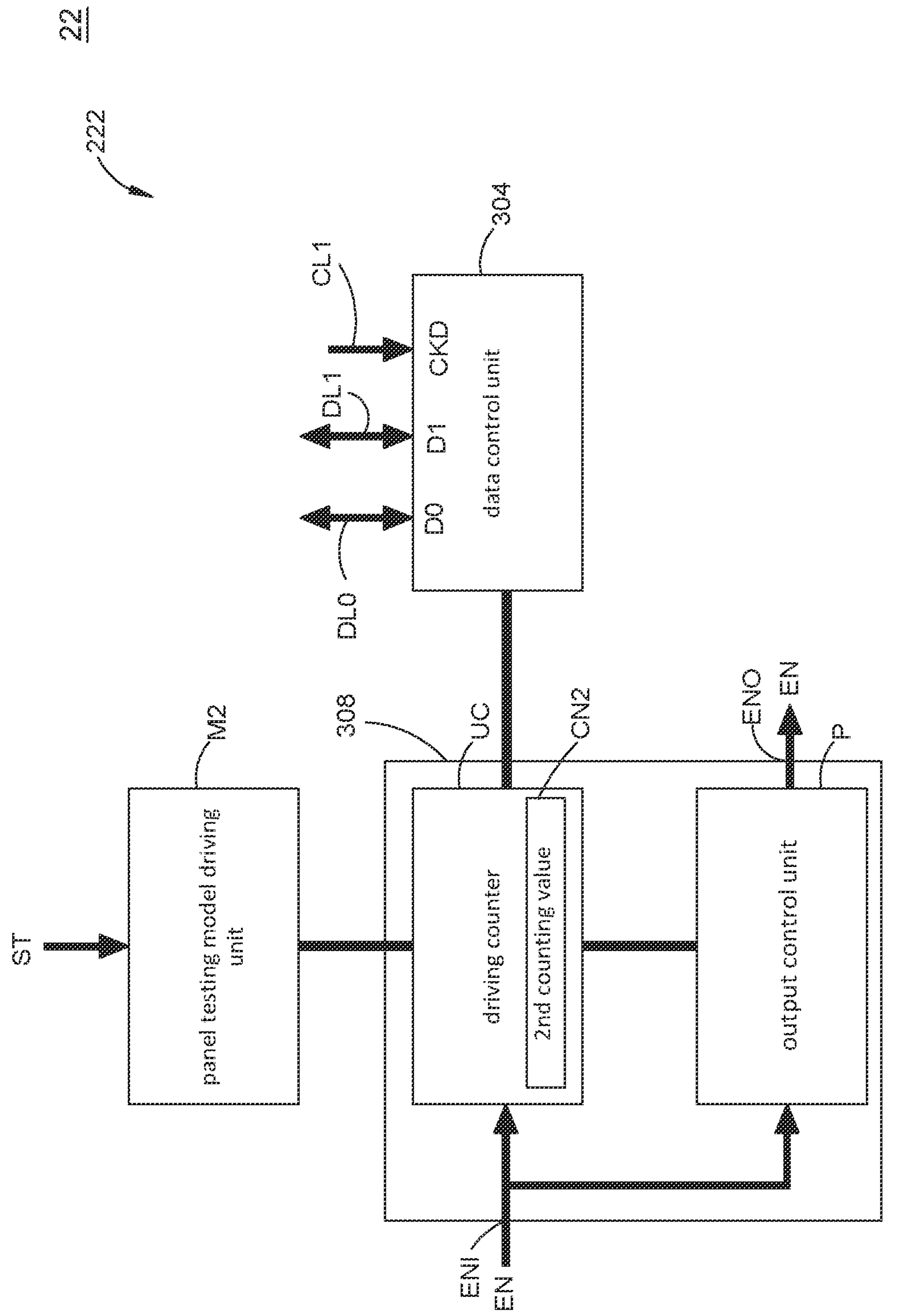
FIG. 1D shows a block diagram of the driver according to the first embodiment of the present application.

Please refer to FIG. 1C and FIG. 1D together, in which the drawings of FIG. 1C and FIG. 1D show block diagrams of the control circuit and the driver according to the first embodiment of the present application. As shown in FIG. 1C, the control circuit 10 according to the present application includes a first testing module 12 for performing self-tests. The first testing module 12 includes a system control and processing unit SC, a clock signal unit CG, a panel testing model control element M1, a control counter CC, and a data detector DE. The system control processing unit SC receives the clock control signal CLK generated by the clock signal unit CG for correspondingly generating the enable signal EN and a testing command CMD according to the clock control signal CLK. The enable signal EN is outputted via the enable output node ENO. In addition, the system control processing unit SC generates the testing command CMD to the panel testing model control element M1, which generates a start signal ST according to the testing command CMD. The control counter CC counts a first counting value according to the data comparison result of the data detector DE. For example, when the comparison result is YES, the first counting value is increased by one.

As shown in FIG. 1D, according to the present embodiment, a driver 22 is taken as an example for illustrating the drivers 201~20N as described above. The driver 22 includes a second testing module 222 used for performing self-tests and includes a data control unit 304, an enable unit 308, and a panel testing model driving unit M2. The enable unit 308 includes a driving counter UC and an output control unit P. The panel testing model driving unit M2 is used for receiving the start signal ST for initializing the testing mode. Thereby, the enable unit 308 will drive the driver 22 to perform testing upon receiving the enable signal EN. The first data node DO, the second data node D1, and the data clock node CKD of the data control unit 304 are coupled to the first data node DO, the second data node D1, and the data clock node CKD of the data detector DE via the first data line DL0, the second data line DL1, and the second clock line CL1, respectively. The driving counter UC of the enable unit 308 receives the enable signal EN via the enable input node ENI of the enable unit 308 and counts a second counting value CN2 according to the enable signal EN. For example, each time when the enable signal EN is enabled, namely, the voltage level is high, the second counting value is increased by one. Besides, the driving counter UC of the driver 22 drives the output control unit P to receive the enable signal EN via enable input node ENI of the enable unit 308. Thereby, the enable output node ENO of the driver 22 may output the enable signal EN to the next driver connected in series with thereof.

Figure 2:
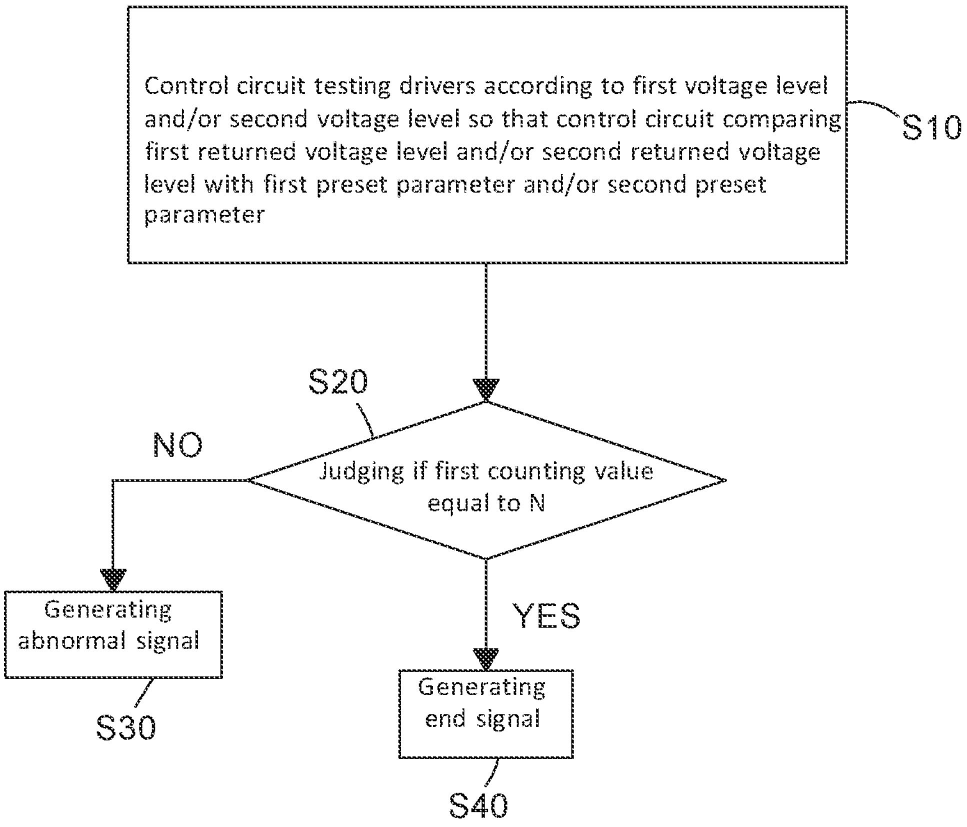
FIG. 2 shows a flowchart of the method for testing the display driving circuit according to the first embodiment of the present application.

Please further refer to FIG. 2, which shows a flowchart of the method for testing the display driving circuit according to the first embodiment of the present application. As shown in the figure, the method for testing a plurality of drivers connected in series according to the present application is that the control circuit 10 tests the plurality of drivers 201~20N, which are connected in series. The control circuit 10 transmits the enable signal EN to the plurality of drivers 201~20N for driving them to perform self-tests sequentially. Namely, the tests are performed from the first driver 201 to the Nth driver 20N. According to the present embodiment, the control circuit 10 testing the first driver 201 and the second driver 202 is taken as an example. The testing method according to the present application comprises the following step:

Step S10: Control circuit testing drivers according to first voltage level and/or second voltage level so that control circuit comparing first returned voltage level and/or second returned voltage level with first preset parameter and/or second preset parameter.

In the step S10, the control circuit 10 transmits the first voltage level and the second voltage level via the first data line DL0, the second data line DL1, or their combination for testing the first driver 201. By this method, the plurality of drivers 201~2N may perform self-tests. The first driver 201 may generate the corresponding first returned voltage level and the second returned voltage level according to the first voltage level and the second voltage level and returned voltage level along the original path or switch their paths to the control circuit 10, so that the control circuit 10 compares the first returned voltage level and/or the second returned voltage level returned by the first driver 201 with the first preset parameter and/or the second preset parameter and thus performing self-tests.

In addition, the testing method according to the present application further comprises:

Step S20: Judging if first counting value equal to N;

Step S30: Generating abnormal signal; and

Step S40: Generating end signal.

In the step S20, the system control processing unit SC judges if the counter CC has increased its counting value to N, meaning that the system control processing unit SC may judge if the Nth driver 20N has completed self-tests. When the judgment is false (NO), the system control processing unit SC executes the step S30 for stopping self-tests and generating an abnormal signal. When the judgment is true (YES), the system control processing unit SC executes the step S40 for generating an end signal represented that the first driver 201 to the Nth driver 20N has completed self-tests already.

The detailed steps of the step S10 is described in the following.

Figure 3A:
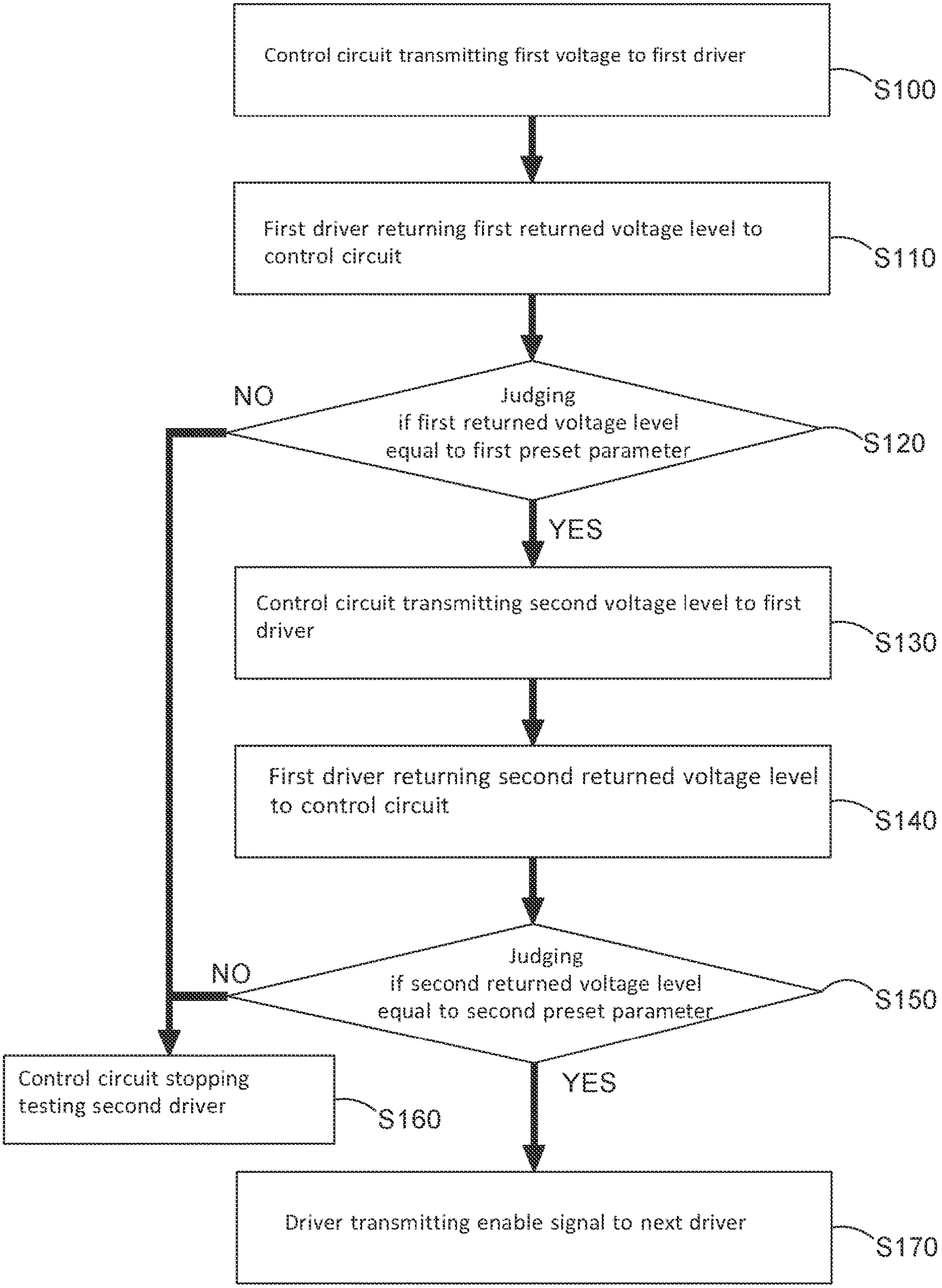
FIG. 3A shows a flowchart of the method for testing the display driving circuit according to the second embodiment of the present application.
Figure 3B:
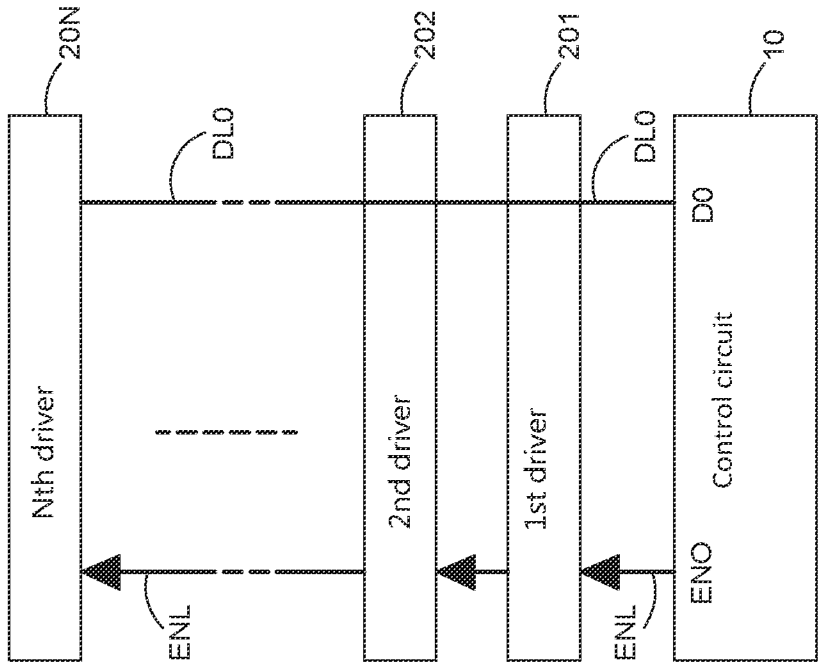
FIG. 3B shows a schematic diagram of the control circuit, the drivers, and the data line according to the first embodiment of the present application.

Please further refer to FIG. 3A, which shows a flowchart of the method for testing the display driving circuit according to the second embodiment of the present application. The step S10 includes the following steps:

Step S100: Control circuit transmitting first voltage level to first driver;

Step S110: First driver returning the first returned voltage level to control circuit;

Step S120: Judging if first returned voltage level equal to first preset parameter;

Step S130: Control circuit transmitting second voltage level to first driver;

Step S140: First driver returning the second returned voltage level to control circuit;

Step S150: Judging if second returned voltage level equal to second preset parameter;

Step S160: Control circuit stopping testing second driver; and

Step S170: First driver transmitting enable signal to second driver.

When the first returned voltage level is not equal to the first preset parameter or the second returned voltage level is not equal to the second preset parameter, the control circuit 10 stops proceeding to test the next driver.

Please refer to FIG. 1C, FIG. 1D, and F FIG. 3A to FIG. 3F. As shown in FIG. 3A to FIG. 3F, according to the present embodiment, the control circuit 10 transmitting data to the first driver 201 and the second driver 202 via the first data line DL0 is taken as an example for following illustration.

In the step S100, the first testing module 12 of the control circuit 10 transmits a first voltage level V1 to the data control unit 304 of the first driver 201 via the first data node D0 of the data detector DE.

In the step S110, the data control unit 304 of the first driver 201 generates a first returned voltage level B0 according to the first voltage level V1 and transmits the first returned voltage level B0 to the control circuit 10 via the first data node D0 of the data control unit 304.

In the step S120, the data detector DE of the control circuit 10 compares the first returned voltage level B0 and the first preset parameter DE0. When the first returned voltage level B0 is equal to the first preset parameter DE0, the control circuit 10 executes the step S130. When the first returned voltage level B0 is not equal to the first preset parameter DE0, the control circuit 10 executes the step S160.

In the step S130, the first data node D0 of the data detector DE of the control circuit 10 transmits a second voltage level V2 to the data control unit 304 of the first driver 201.

In the step S140, the data control unit 304 of the first driver 201 generates a second returned voltage level B1 according to the second voltage level V2 and transmits the second returned voltage level B1 to the control circuit 10 via the first data node D0 of the data control unit 304.

In the step S150, the data detector DE of the control circuit 10 compares the second returned voltage level B1 and the second preset parameter DEL. When the second returned voltage level B1 is equal to the second preset parameter DE1, the control circuit 10 executes the step S170. When the second returned voltage level B1 is not equal to the second preset parameter DEL, the control circuit 10 executes the step S160.

In the step S160, the control circuit 10 will stops testing via the system control processing unit SC. In particular, the system control processing unit SC drives the panel testing model control element M1 to stop the corresponding driver 22 for stopping self-tests.

In the step S170, the system control processing unit SC of the control circuit 10 outputs the enable signal EN to the enable unit 308 for enabling the driving counter UC to drive the output control unit P outputting the enable signal EN to the next driver via the enable line ENL, namely, inputting the enable signal EN to the enable unit 308 of the second driver 202.

Figure 3C:
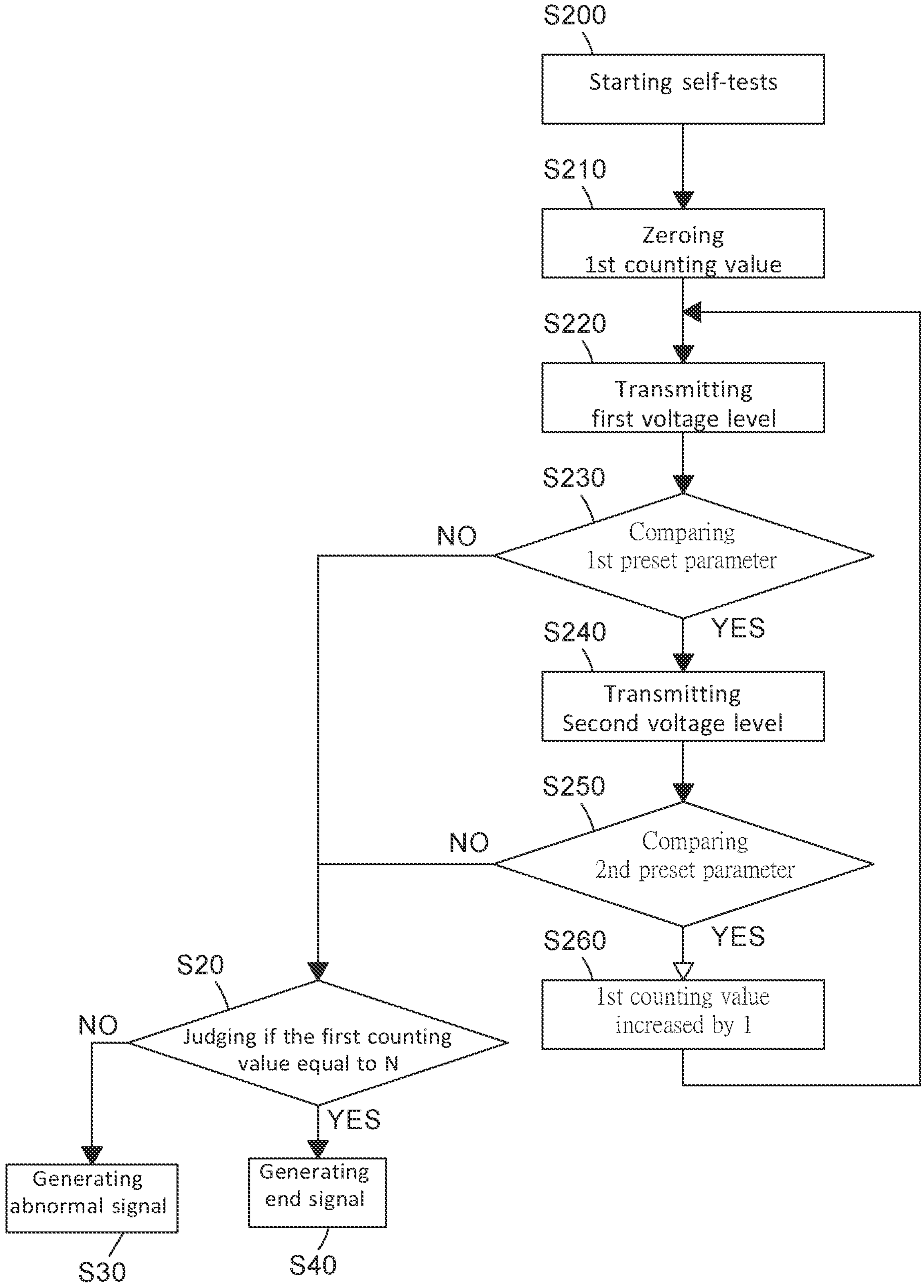
FIG. 3C shows a schematic diagram of the steps of the control circuit according to the first embodiment of the present application.
Figure 3D:
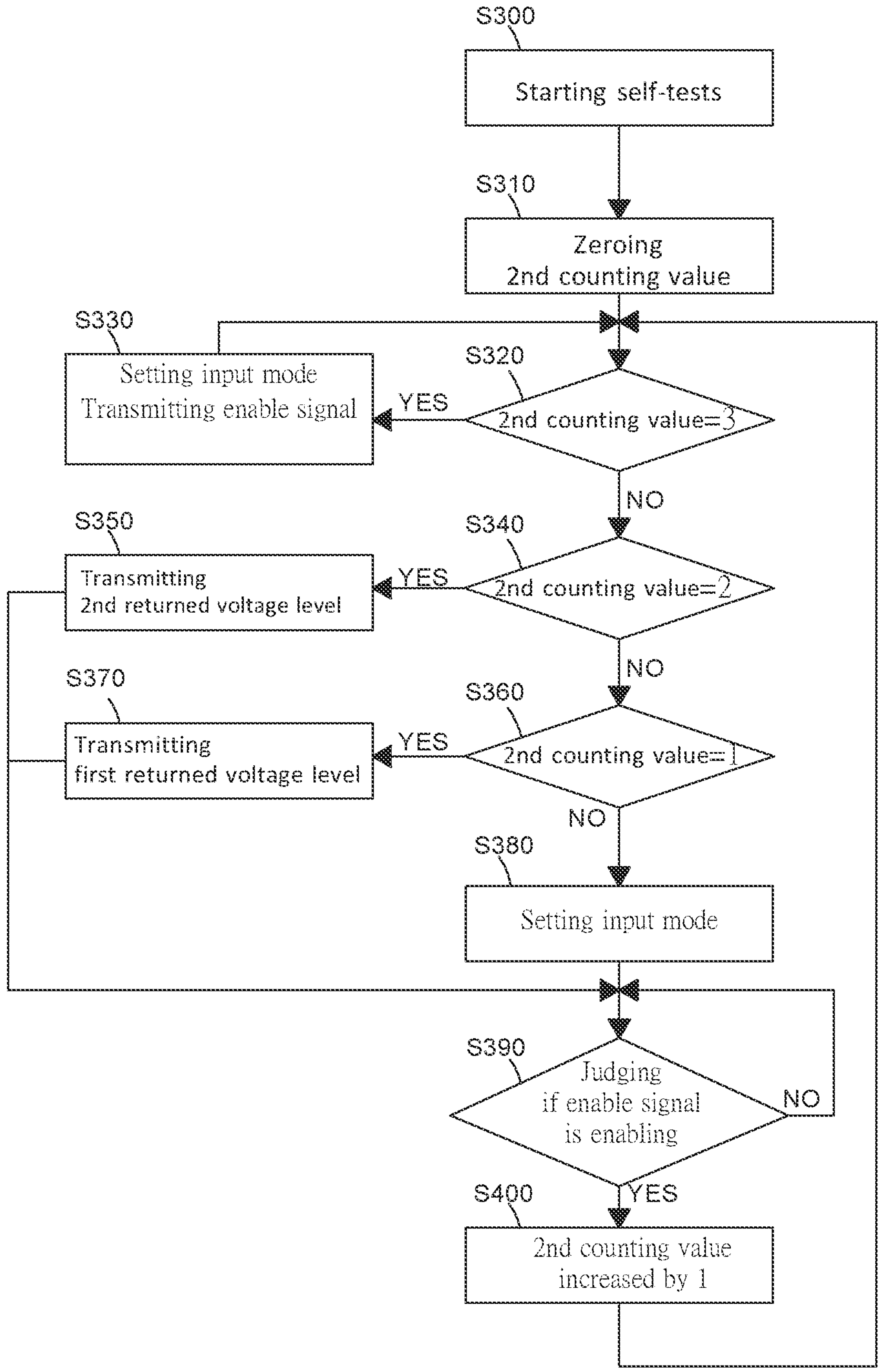
FIG. 3D shows a schematic diagram of the steps of the driver according to the first embodiment of the present application.

To further illustrate that the control circuit 10 and the first driver 201 perform self-tests according to the present application, please further refer to FIG. 3C, which shows a schematic diagram of the steps of the control circuit according to the first embodiment of the present application, and together refer to FIG. 3D, which shows a schematic diagram of the steps of the driver according to the first embodiment of the present application. As shown in FIG. 3C and FIG. 3D, the flowcharts of the control circuit 10 and the first driver 201 performing self-tests. In the step S200, the control circuit 10 starts to execute self-tests. The system control processing unit SC receives a clock control signal CL from a clock signal unit CG for driving a panel testing model control element M1. In the step S210, the system control processing unit SC drives the control counter CC to execute zeroing. In other words, the first counting value CN1 of the control counter CC is driven to zero. The control circuit 10 transmits the enable signal EN to the first driver 201 via the system control processing unit SC. The panel testing model control element M1 of the first testing module 12 transmits the start signal ST to the panel testing model driving unit M2 of the second testing module 222.

The first driver 201 executes the step S330. The second testing module 222 of the first driver 201 receives the start signal ST, which enables the driving counter UC to start counting and hence executing self-tests is started. In the step S310, the first driver 201 zeros the driving counter UC. In other words, the driving counter UC zeros the second counting value CN2. In the step S320, the driving counter UC is zeroed and second counting value CN2 is not increased to 1, 2, or 3. Thereby, the judgment is maintained as false (NO) for executing the step S340 to the step S380. In the step S380, the first driver 201 receives the start signal ST and the first driver 201 is driven to set in the input mode. Namely, the first data node D0 of the first driver 201 is set to the input mode. Next, in the step S390, the first driver 201 judges if the received enable signal EN is enabled. If the judgment is true (YES), the step S400 will be executed. The driving counter UC of the first driver 201 counts the second counting value CN2 as the second counting value CN2 is increased by one. At this moment, the first counting value CN1 is 0 and the second counting value is 1. Then, the control circuit 10 executes the step S220 for transmitting the first voltage level V1 to the first driver 201, which continues to execute the steps S320 to S360. In the step S360, since the second counting value CN2 is 1, the step S370 is executed for transmitting the first returned voltage level B0 to the control circuit 10 according to the first voltage level V1. In addition, the step S390 is executed until the received enable signal EN is judged to be enabled. When the first driver 201 receives the enable signal EN in enabled, the step S400 is executed, in which the driving counter UC counts the second counting value CN2 as the second counting value CN2 is increased by one. At this moment, the second counting value CN2 is 2.

Figure 3E:
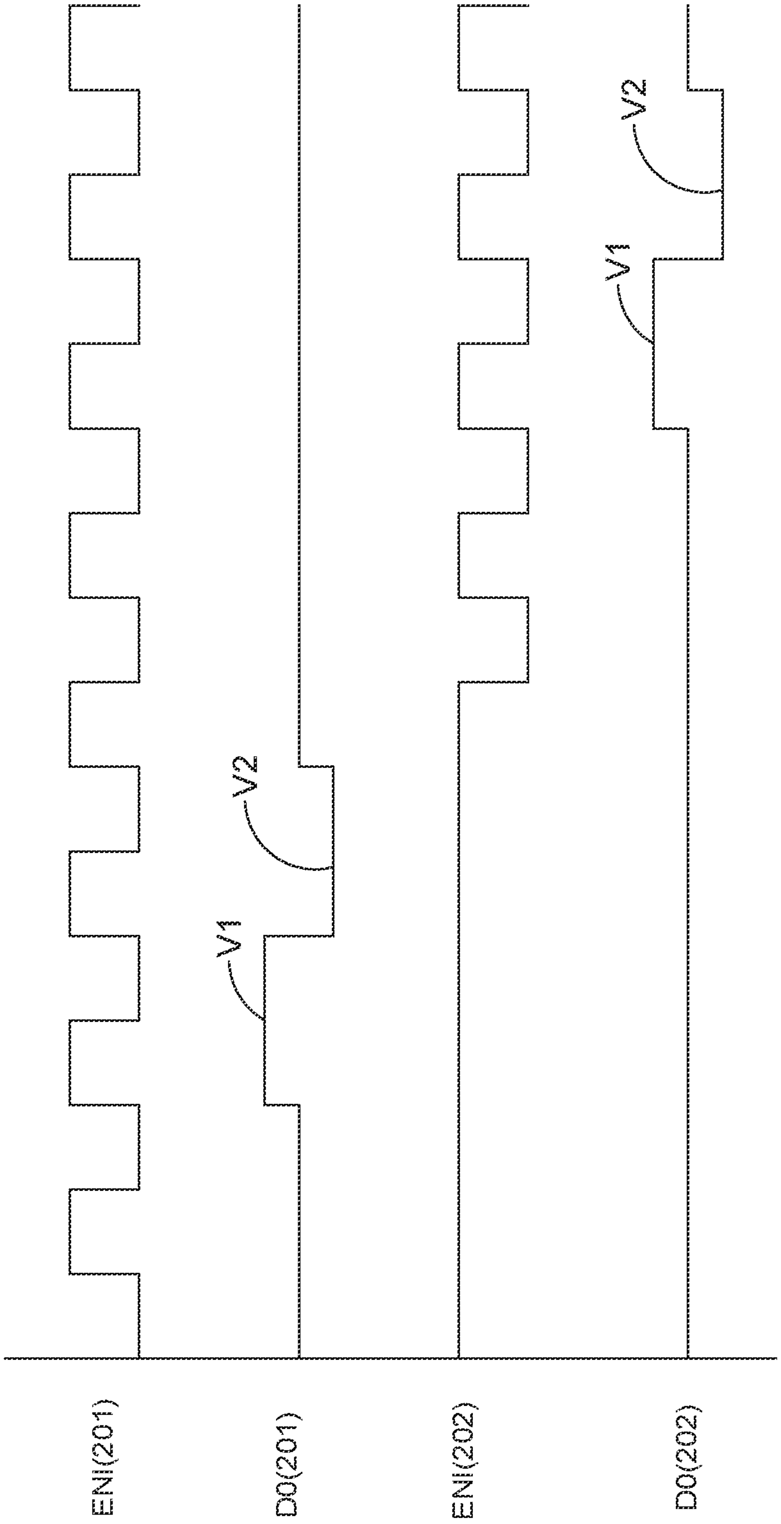
FIG. 3E shows a signal timing diagram according to the first embodiment of the present application.
Figure 3F:
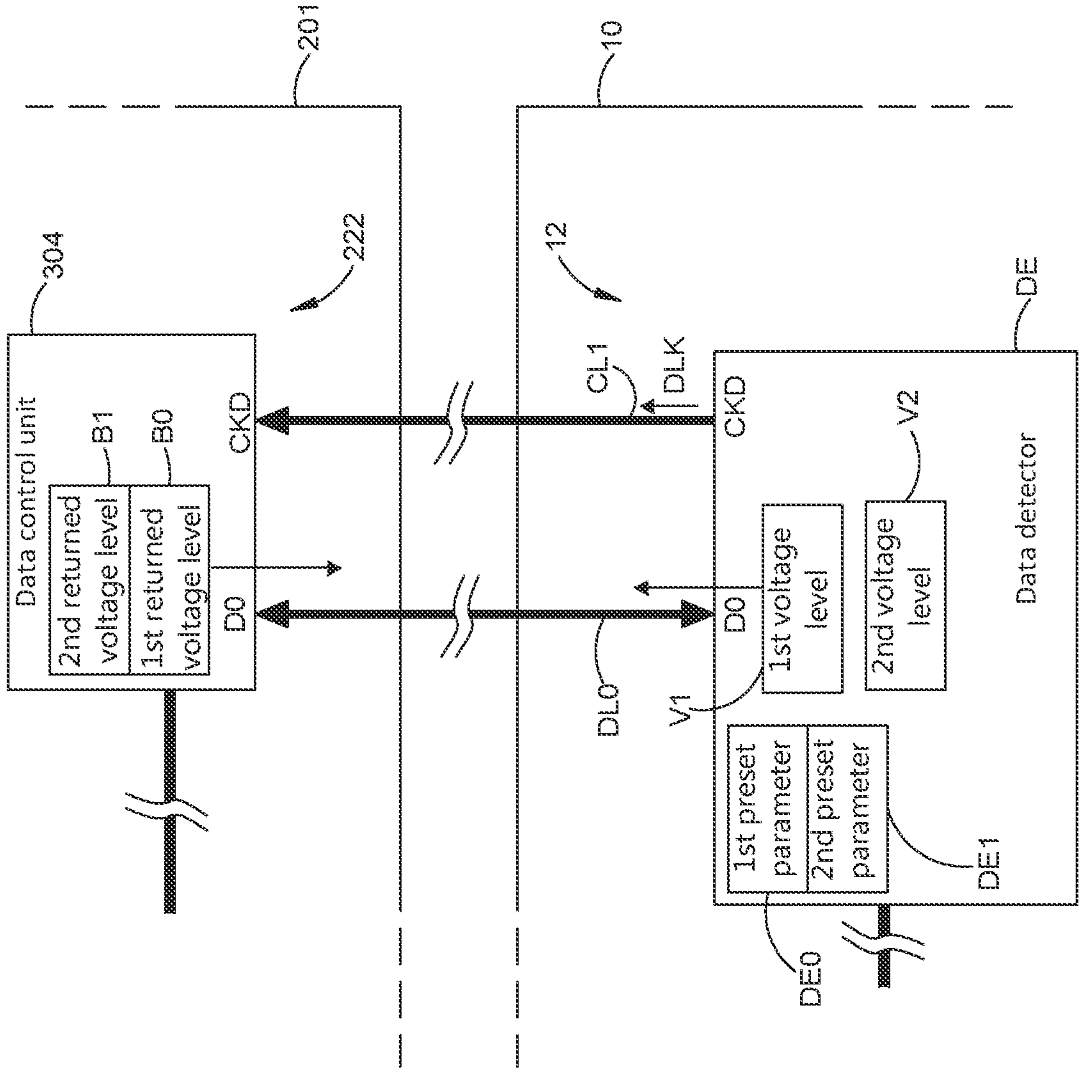
FIG. 3F shows a schematic diagram of signal transmission according to the first embodiment of the present application.

Please refer to FIG. 3E and FIG. 3F, which shows a signal timing diagram and a schematic diagram of signal transmission according to the first embodiment of the present application. According to the present embodiment, when the enable signal EN is enabled, the control circuit 10 starts to execute self-tests and transmits the start signal ST to the first driver 201 concurrently so that the first driver 201 starts self-tests as well. The control circuit 10 transmits a first voltage level V1 to the data control unit 304 of the first driver 201 via the data detector DE and the first data line DL0. The first data node D0 of the first driver 201 is used for receiving the first voltage level V1. According to the first embodiment, the second counting value CN2 is 1 and the first voltage level V1 is enabled. The control circuit 10 transmits the first voltage level V1 to the first driver 201 so that the first driver 201 may return the first returned voltage level B0 to the control circuit 10 via the first data line DL0. In other words, the first voltage level V1 is transmitted to the control circuit 10. The first voltage level V1 is used to judge if short circuit occurs at the first driver 201. According to the present embodiment, although the first voltage level V1 is proposed to be high level, it is not limited to a high level. Once the first voltage level V1 may be used to make sure that the first driver 201 is not short-circuited, the tests may go on.

Please together refer to FIG. 1C, FIG. 1D, and FIG. 3A to FIG. 3F. The control circuit 10 continues to execute the step S230. The data detector DE of the control circuit 10 compares the first returned voltage level B0 and the first preset parameter DE0. When the judgment is true (YES), the step S240 is executed, in which the control circuit 10 transmits the second voltage level V2 to the first driver 201. When the judgment is false (NO), the step S20 is executed. According to the present embodiment, the corresponding voltage of the first preset parameter DE0 is the first voltage level V1. Thereby, the control circuit 10 receives the first returned voltage level B0 via the data detector DE and compares it with the first preset parameter DE0, which is equivalent to comparing the first voltage level with the first voltage level and hence making the judgment true (YES). Next, the step S240 is executed. Nonetheless, when the judgment is false (NO), the step S20 will be executed, in which the control circuit 10 judges if the first counting value CN1 is equal to N, meaning to judge if the tests have been performed to the Nth driver 20N. When the first counting value CN1 is N, the step S40 is executed, meaning that the self-tests have been completed and ended. If not, the step S30 is executed, meaning that the current driver test is abnormal. At this time, the control circuit 10 stops testing and the system control processing unit SC will generate an abnormal signal for notifying. For example, if the second driver 202 is abnormal, the abnormal signal will correspond to the second driver 202.

Please refer to FIG. 1C, FIG. 1D, and FIG. 3A to FIG. 3F. In the step S240, the control circuit 10 transmits a second voltage level V2 to the data control unit 304 of the first driver 201 via the data detector DE and the first data line DL0. The first data node D0 of the first driver 201 is used for receiving the second voltage level V2.

According to the present embodiment, the second voltage level V2 is low level. The control circuit 10 transmits the second voltage level V2 to the first driver 201. The data control unit 304 of the first driver judges if the voltage level variation occurs in the first driver 201 according to the pull-down second voltage level V2. Thereby, the second voltage level V2 must be different from the first voltage level V1. According to the present embodiment, although the second voltage level V2 is proposed to be low level, it is not limited to a low level. Once the second voltage level V2 may be used to make sure that the voltage level variation occurs in the first driver 201, the tests may go on.

At this time, the first driver 201 executes the step S320 and judges false (NO). Then the first driver 201 transmits the second returned voltage level B1 to the control circuit 10 via the first data line DL0. The control circuit 10 may use the second returned voltage level B1 to judge if the voltage variation occurs in the first driver 201. The first driver 201 returns the second returned voltage level B1 to the control circuit 10 via the first data line DL0, which means that the first driver 201 returns the second voltage level V2 to the control circuit 10 directly. The first driver 201 executes the steps S350 and S390 until the received enable signal EN is judged to be enabled. If the first driver 201 receives the enable signal EN, the step S400 is executed, in which the driving counter UC counts and the second counting value CN2 is increased by one. At this time, the second counting value CN2 is 3.

Please refer to FIG. 1C and FIG. 1D again and to FIG. 3A to FIG. 3F. After the control circuit 10 receives the second returned voltage level B1, the step S250 is executed, in which the second returned voltage level B1 is compared with the second preset parameter DE1 preset in the control circuit 10 or input to the control circuit 10 during the testing process. According to the present embodiment, the corresponding voltage level of the second preset parameter DE1 is the second voltage level V2. When the two are equal, the control circuit 10 continues to execute the step S260. When the two are not equal or the control circuit 10 does not receive the second returned voltage level B1, the control circuit 10 continues to execute the step S20. The control circuit 10 judges if the first counting value CN1 is equal to N. The steps S20 to S40 will not be described again.

After finishing the step S250 and the second returned voltage level B1 equal to the second preset parameter DE1, the control circuit 10 executes the step S260. The control counter CC of the control circuit 10 is increased by one. Namely, the first counting value CN1 is increased by one. At this time, CN1 is equal to 1. Meanwhile, the control circuit 10 transmits the enable signal EN to the first driver 201. At this time, the second counting value CN2 is 3. The first driver 201 continues to execute the step S320. Since the judgment is true, the step S330 is executed next. The first driver 201 is set to the input mode. Namely, the first data node D0 of the first driver 201 is set to the input mode. Besides, the driving counter UC of the first driver 201 drives the output control unit P to output the enable signal EN to the enable input node ENI of the next driver 202 connected in series via the enable output node ENO. For example, as shown in FIG. 1B, the enable output node ENO of the first driver 201 is coupled to the enable input node ENI of the second driver 202. Thereby, the first driver 201 transmits the enable signal EN to the second driver 202. The control circuit 10 executes the steps 220 to S260 repeatedly and the second driver 202 executes the steps S300 to S400 repeatedly until the first counting value CN1 is N (meaning that tests of the plurality of drivers 201~20N have been completed) or executes the step S30 for judging abnormality and stopping testing.

Please refer to FIG. 3E again. ENI(201) in FIG. 3E represents the signal at the enable input node ENI of the first driver 201; D0(201) represents the signal at the first data node D0 of the first driver 201; ENI(202) represents the signal at the enable input node ENI of the second driver 202; and D0(202) represents the signal at the first data node D0 of the second driver 202. According to a preferred embodiment, the first voltage level V1 and the second voltage level V2 are reversed. Nonetheless, the present application is not limited to the embodiment. Once the first voltage level V1 and the second voltage level V2 may achieve the testing function, the embodiment will be applicable. According to the present embodiment, the control circuit 10 outputs the first voltage level V1 and the second voltage level V2 at different times.

Please refer to FIG. 3A and FIG. 3C again. In FIG. 3A, the steps S100-S150 are executed for judging if the step S170 should be executed. According to another embodiment, if the judgment in the step S150 is true, then the steps S100-S120 will be added. At this time, if the judgment in the step S120 is true, then the step S170 will be executed. In FIG. 3C, the steps S220~S250 are executed for judging if the step S260 should be executed. According to another embodiment, if the judgment in the step S250 is true, then the steps S220~S230 will be added. At this time, if the judgment in the step S230 is true, then the step S260 will be executed.

According to the previous embodiment of the method for testing display driving circuit of the present application, the panel circuit is adopted for testing. A data line DL0 between the control circuit 10 and the drivers is used to transmit the voltage levels V1, V2 and the returned voltage levels B0, B1 for performing built-in self-tests. Thereby, the problem of requiring external testing circuits or testers may be solved.

Next, please refer to FIG. 4A to FIG. 4F, which show a flowchart and a schematic diagram of the control circuit, the drivers, and the data lines, a schematic diagram of the steps of the control circuit, a schematic diagram of the steps of the driver, and a signal timing diagram of the method for testing the display driving circuit according to the present application. Based on the previous embodiment, the present application further includes a third voltage level V3 and a fourth voltage level V4. The first voltage level V1 and the third voltage level V3 are transmitted via the first data line DL1; the second voltage level V2 and the fourth voltage level V4 are transmitted via the second data line DL1. Preferably, the third voltage level V3 and the fourth voltage level V4 may be the reversed state of the first voltage level V1 and the second voltage level V2. Alternatively, the fourth voltage level V4 is equal to the first voltage level V1; the third voltage level V3 is equal to the second voltage level V2. Nonetheless, the present application is not limited to the above embodiments. Once the third voltage level V3 and the fourth voltage level V4 may achieve the testing function, the embodiment will be applicable. In addition, the first driver 201 returns the corresponding returned voltage levels B0~B3 to the control circuit 10 via the first data line DL0 and the second data line DL1 for testing.

Please refer to FIG. 1C and FIG. 1D again and to FIG. 4A to FIG. 4F. The present embodiment comprises steps of:

- Step S102: Control circuit transmitting first voltage level and second voltage level to first driver;
- Step S112: First driver transmitting first returned voltage level and second returned voltage level to control circuit;
- Step S122: Control circuit comparing if first returned voltage level and second returned voltage level equal to first preset parameter and second preset parameter;
- Step S132: Control circuit transmitting third voltage level and fourth voltage level to first driver;
- Step S142: First driver transmitting third returned voltage level and fourth returned voltage level to control circuit;
- Step S152: Control circuit comparing if third returned voltage level and fourth returned voltage level equal to third preset parameter and fourth preset parameter;
- Step S160: Control circuit stopping testing second driver; and
- Step S170: Driver transmitting enable signal to next driver.

The steps S160 and S170 are identical to the previous embodiment; the details will not be repeated. Next, in the step S102, the control circuit 10 transmits the first voltage level V1 to the first driver 201 via the first data line DL0 and the second voltage level V2 to the first driver 201 via the second data line DL0. The first data node D0 of the first driver 201 is used for receiving the first voltage level V1; the second data node D1 of the first driver 201 is used for receiving the second voltage level V2. According to the present embodiment, the first voltage level V1 is high level; the second voltage level V2 is low level. The judgment if the first driver 201 is short-circuited is performed by pulling up the first voltage level V1 and pulling down the second voltage level V2. According to the present embodiment, although the first voltage level V1 is high level and the second voltage level V2 is low level. Nonetheless, the present application is not limited to the embodiment. Once the first voltage level V1 and the second voltage level V2 may be used to make sure that the first driver 201 is not short-circuited, the tests may go on.

In the step S112, after judging if the first driver 201 is short-circuited, the first driver 201 returns the first returned voltage level B0 to the control circuit 10 via the first data line DL0 and returns the second returned voltage level B1 to the control circuit 10 via the second data line DL1. According to the present embodiment, the first driver 201 may return the first voltage level V1 and the second voltage level V2 to the control circuit 10 directly. Next, in the step S122, the first returned voltage level B0 and the second returned voltage level B1 are compared with the first preset parameter DE0 and the second preset parameter DEL. When they are equal, the step S132 is executed.

In the step S132, the control circuit 10 transmits the third voltage level V3 and the fourth voltage level V4. According to the present embodiment, the third voltage level V3 is low level and the fourth voltage level V4 is high level. The judgment if the voltage level variation occurs in the first driver 201 is performed by pulling down the third voltage level V3 and pulling up the fourth voltage level V4. Thereby, the third voltage level V3 must be different from the first voltage level V1, and the fourth voltage level V4 must be different from the third voltage level V3. According to the second embodiment, although the third voltage level V3 is low level and the fourth voltage level V4 is high level, their voltage levels are not limited. Once the third voltage level V3 and the fourth voltage level V4 may be used to make sure that the voltage variation occurs in the first driver 201, the tests may go on. In the step S142, the first driver 201 transmits the third returned voltage level B2 and the fourth returned voltage level B3 via the first data line DL0 and the second data line DL1 to the control circuit 10. According to the present embodiment, the first driver 201 may return the third voltage level V3 and the fourth voltage level V4 to the control circuit 10 directly. Next, in the step S152, compare the third returned voltage level B2 and the fourth returned voltage level B3 according to the third preset parameter DE2 and the fourth preset parameter DE3. When they are equal, the step S132 is executed. When one of them is not equal, the step S160 is executed.

After finishing a cycle of tests on the first driver 201, likewise, the enable signal EN of the first driver 201 is transmitted to the next driver 202 for testing. The driving counter UC of the first driver 201 drives the output control unit P to output the enable signal EN to the enable input node ENI of the next driver via the enable output node ENO. For example, as shown in FIG. 1B, the enable output node ENO of the first driver 201 is coupled to the enable input node ENI of the second driver 202. Thereby, the first driver 201 transmits the enable signal EN to the second driver 202. The steps 222 to S260 shown in FIG. 4C and the steps S300 to S400 shown in FIG. 4D are executed repeatedly.

Figure 4A:
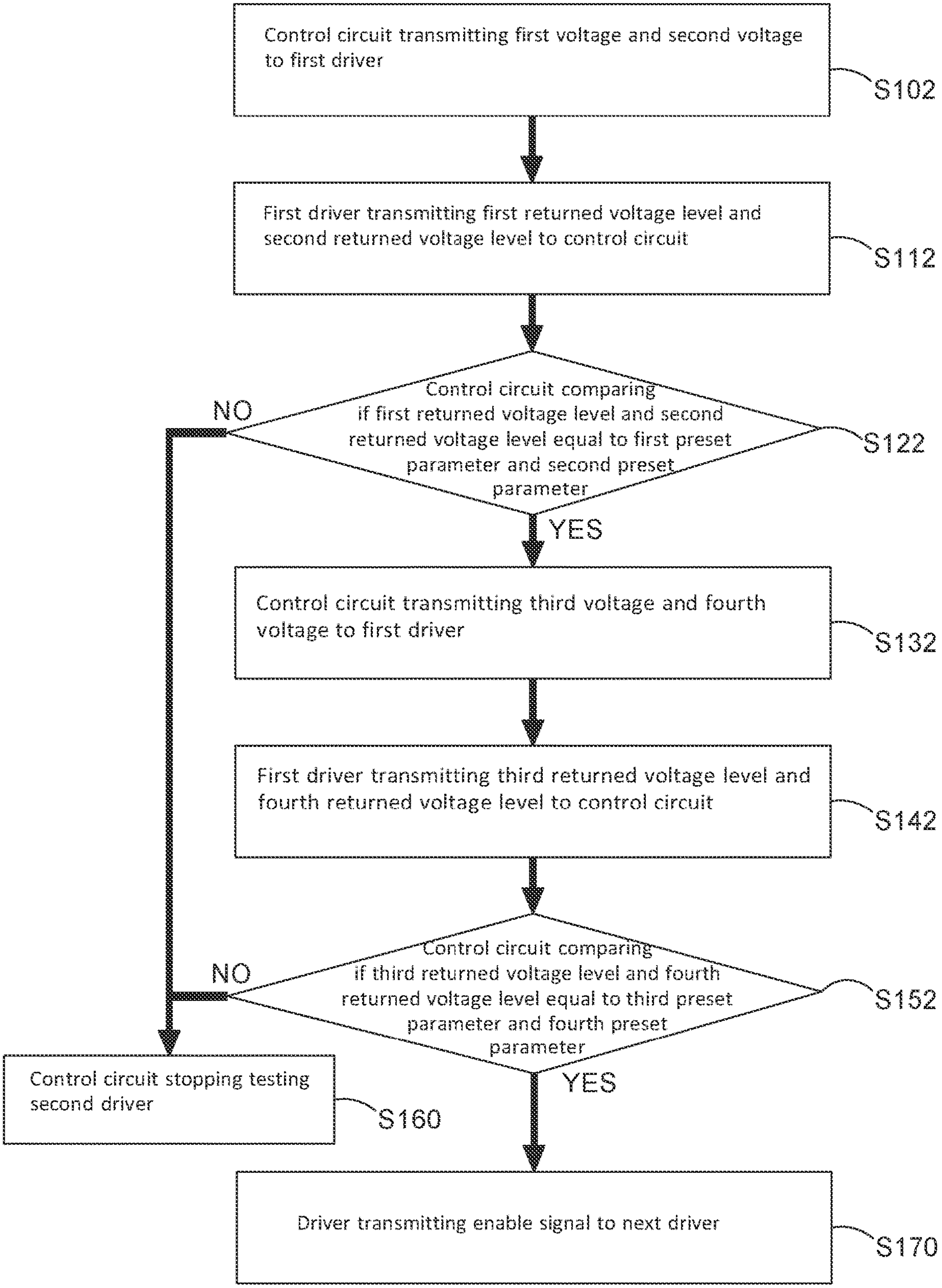
FIG. 4A shows a flowchart of the method for testing the display driving circuit according to the third embodiment of the present application.
Figure 4B:
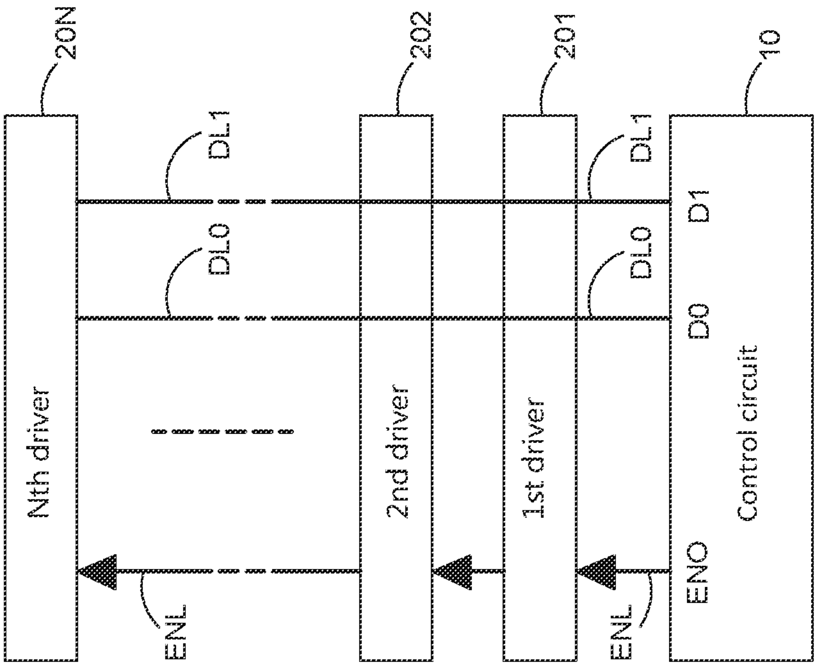
FIG. 4B shows a schematic diagram of the control circuit, the drivers, and the data lines according to the second embodiment of the present application.
Figure 4C:
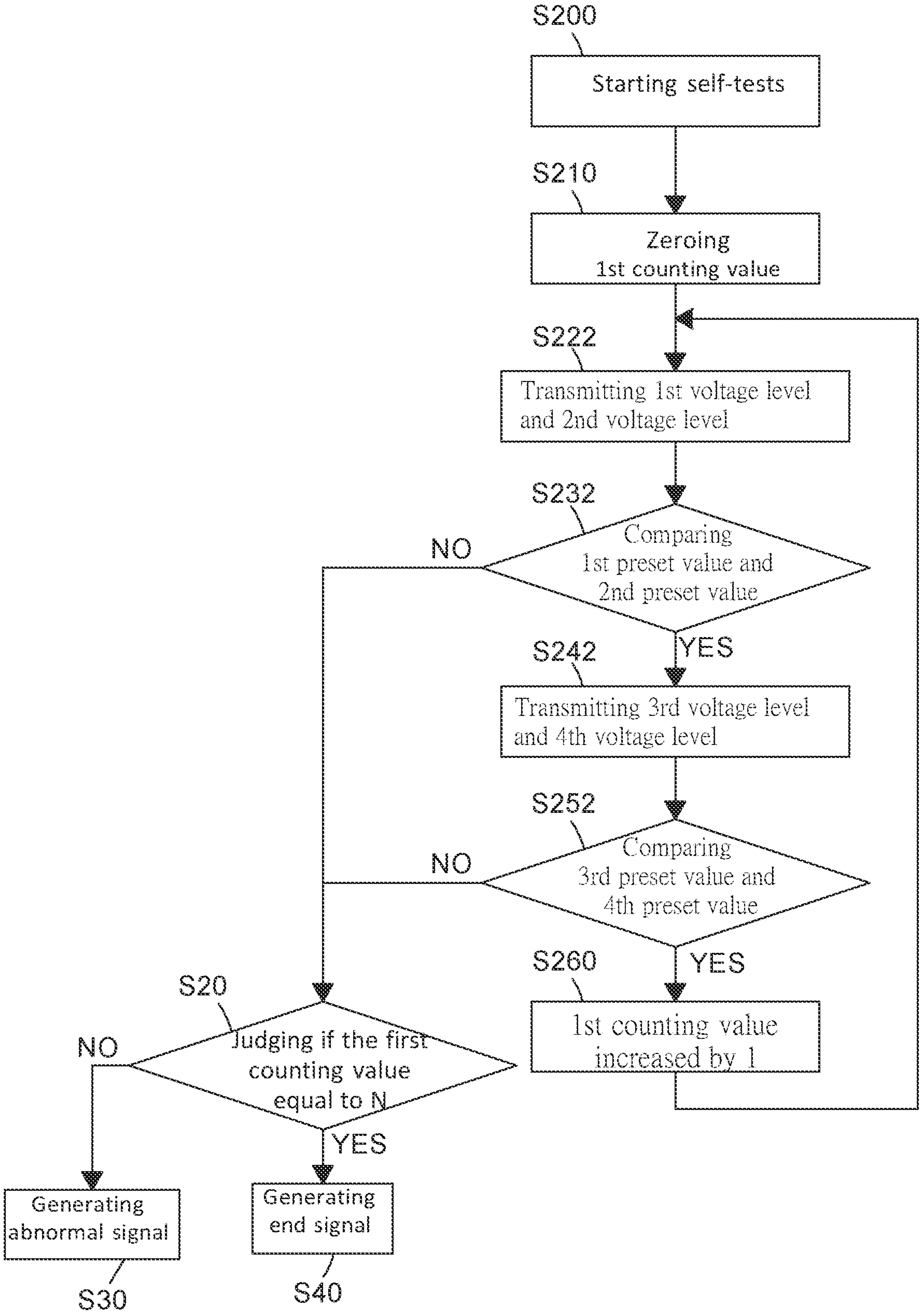
FIG. 4C shows a schematic diagram of the steps of the control circuit according to the second embodiment of the present application.
Figure 4D:
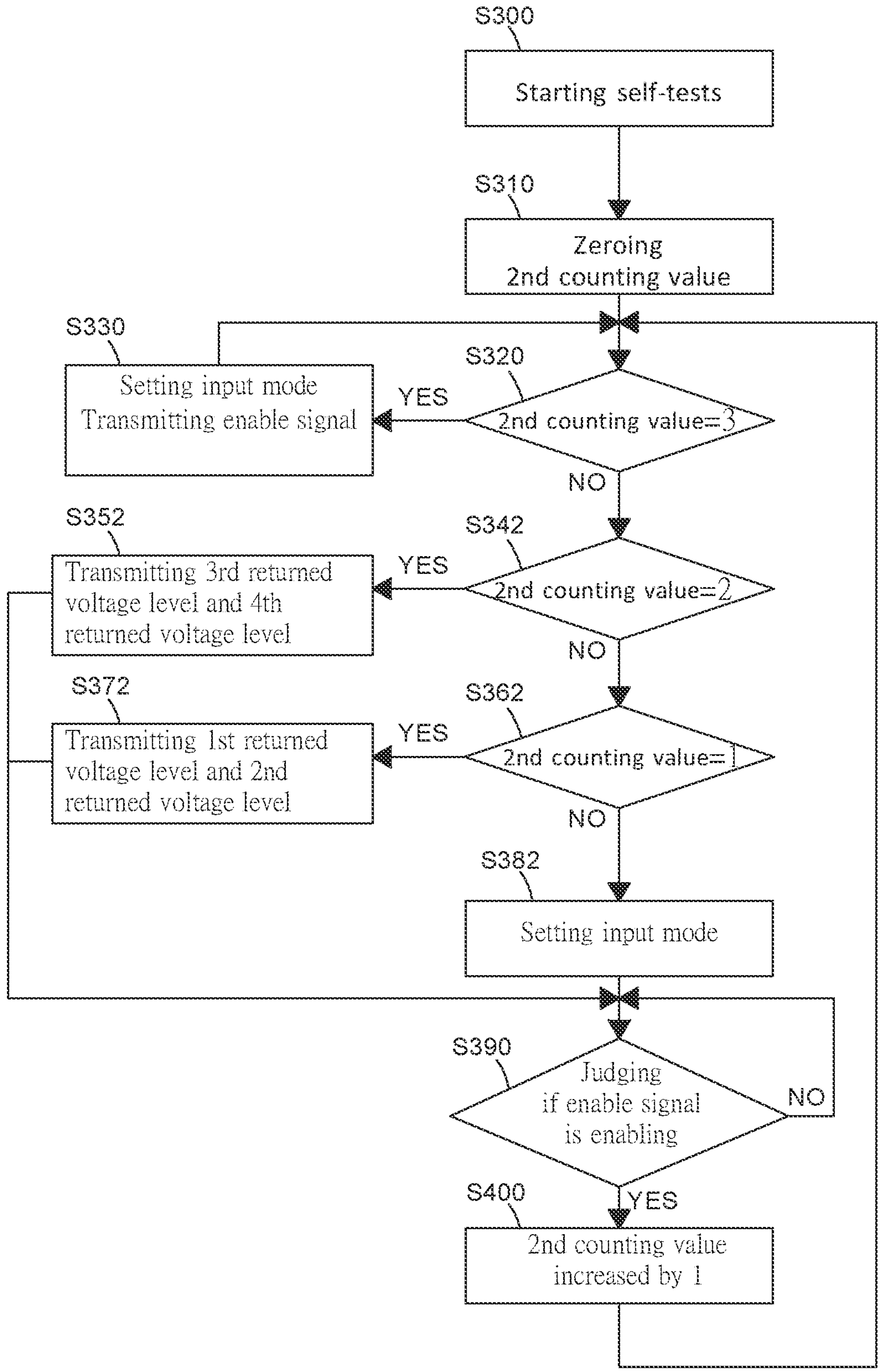
FIG. 4D shows a schematic diagram of the steps of the driver according to the second embodiment of the present application.

Furthermore, please refer to FIG. 4C and FIG. 4D, which show schematic diagrams of the steps with reference to the flowchart shown in FIG. 4A. The difference between FIG. 3C and FIG. 3D according to the previous embodiment is that, in FIG. 4C and FIG. 4D, the control circuit 10 further transmits the third voltage level V3 and the fourth voltage level V4 to the first driver 201 and the second driver 202. In addition, the first driver 201 and the second driver 202 further return the third returned voltage level B2 and the fourth returned voltage level B3.

The steps S200~S210, S260, S20~S40, S300~S310, and S390~S400 are identical to the previous embodiment. Hence, the details will not be repeated. In the step S222, instead, the control circuit 10 transmits the first voltage level V1 and the second voltage level V2 to the first driver 201. Since the second counting value CN2 is 0, the step S382 is executed. The driver 201 is set to the input mode. In other words, the first data node D0 and the second data node D1 of the first driver 201 are set to the input mode. Then the step S400 is executed to make the second counting value CN2 to be 1. Then, in the step S362, since the second counting value CN2 is 1, the step S372 is executed, in which the driving counter UC of the first driver 201 drives the data control unit 304 to return the first returned voltage level B0 and the second returned voltage level B1 to the control circuit 10. Next, the step S400 is executed to make the second counting value CN2 to be 2. Afterward, the control circuit 10 executes the step S232 for comparing according to the first preset parameter DE0 and the second preset parameter DE1 of the data detector DE. When the first returned voltage level B0 is not equal to the first preset parameter DE0 or the second returned voltage level B1 is not equal to the second preset parameter DE1, the control circuit 10 executes the step S20 for driving the first driver 201 to output the enable signal EN to the second driver 202 and judging if the first counting value CN1 is N. When the judgment is false (NO), the control circuit 10 executes the step S30. When the judgment is true (YES), the control circuit 10 executes the step S40.

Figure 4E:
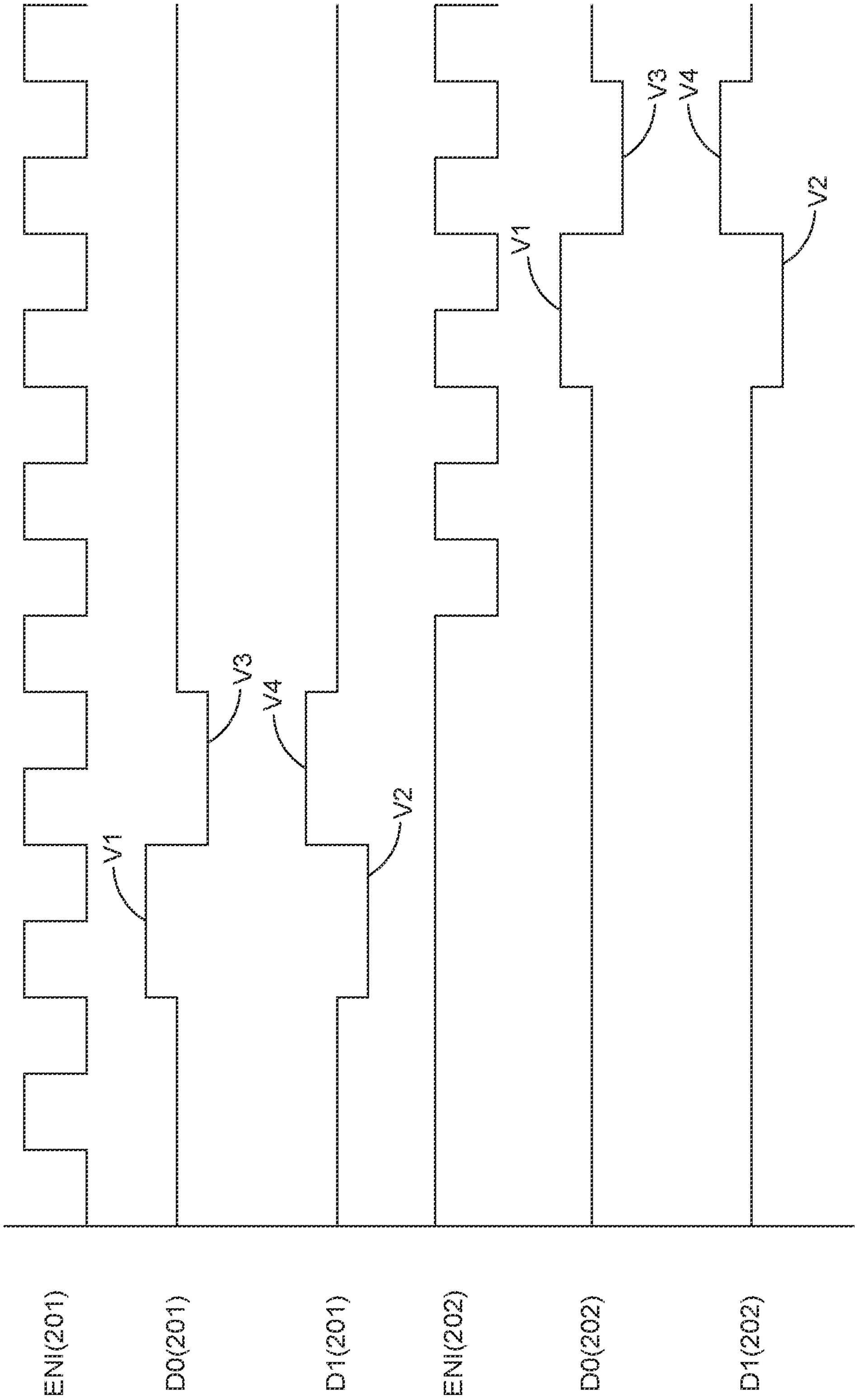
FIG. 4E shows a signal timing diagram according to the second embodiment of the present application.
Figure 4F:
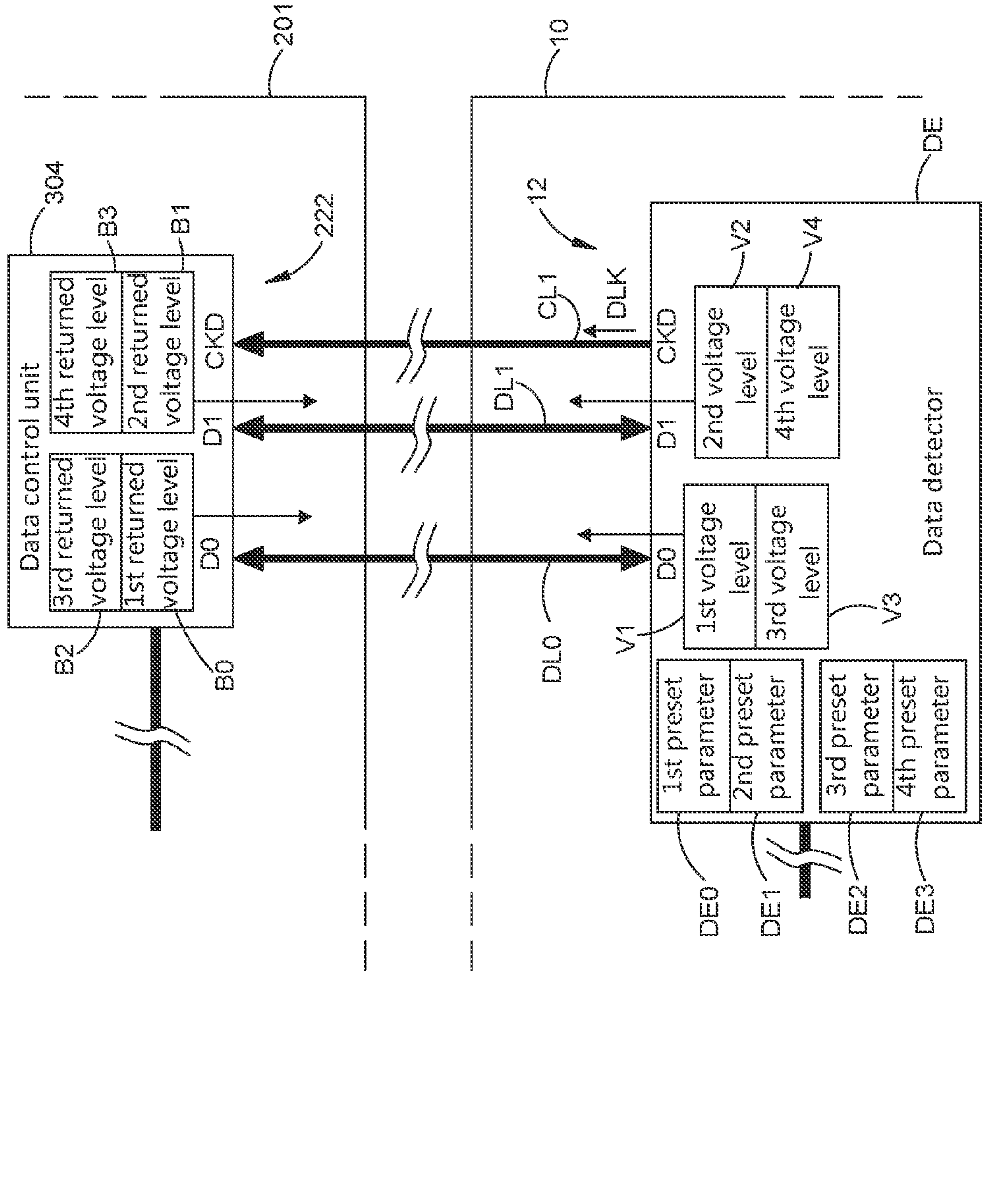
FIG. 4F shows a schematic diagram of signal transmission according to the second embodiment of the present application.

When the first returned voltage level B0 is equal to the first preset parameter DE0 and the second returned voltage level B1 is equal to the second preset parameter DE1, the control circuit 10 executes the step S242. As shown in FIG. 4F, the data detector DE transmits the third voltage level V3 and the fourth voltage level V4 to the data control unit 304 of the first driver 201. Then the first driver 201 executes the step S342. Since the second counting value CN2 is 2, the first driver 201 continues to execute the step S352 and then to execute the step S400, the second counting value CN2 is increased to be 3. As shown in FIG. 4F, the driving counter UC of the first driver 201 drives the data control unit 304 to transmit the third returned voltage level B2 and the fourth returned voltage level B3 to the data detector DE of the control circuit 10. In the step S252, the data detector DE of the control circuit 10 compares the third returned voltage level B2 and the fourth returned voltage level B3 according to the third preset parameter DE2 and the fourth preset parameter DE3. When the third returned voltage level B2 is not equal to the third preset parameter DE2 or the fourth returned voltage level B3 is not equal to the fourth preset parameter DE3, the control executes the step S20. The steps S20 to S40 will not be described again.

When the third returned voltage level B2 is equal to the third preset parameter DE2 and the fourth returned voltage level B3 is equal to the fourth preset parameter DE3, the step S260 is executed. Meanwhile, the first driver 201 continues to execute the step S320. Since the judgment is true, the step S332 is executed. The first driver 201 is set to the input mode. Namely, the first data node D0 and the second data node D1 of the first driver 201 are set to the input mode. In addition, the driving counter UC of the first driver 201 drives the output control unit P to output the enable signal EN to the enable input node ENI of the next driver via the enable output node ENO. For example, as shown in FIG. 1B, the enable output node ENO of the first driver 201 is coupled to the enable input node ENI of the second driver 202. Thereby, the first driver 201 transmits the enable signal EN to the second driver 202.

Please refer again to FIG. 4E. ENI(201) in FIG. 4E represents the signal at the enable input node ENI of the first driver 201; D0(201) represents the signal at the first data node D0 of the first driver 201; ENI(202) represents the signal at the enable input node ENI of the second driver 202; D0(202) represents the signal at the first data node D0 of the second driver 202; and D1(202) represents the signal at the second data node D1 of the second driver 202.

Please refer to FIG. 4A and FIG. 4C again. In FIG. 4A, the steps S102~S152 are executed for judging if the step S170 should be executed. According to another embodiment, if the judgment in the step S152 is true, then the steps S102~S122 will be added. At this time, if the judgment in the step S122 is true, then the step S170 will be executed. In FIG. 4C, the steps S222~S252 are executed for judging if the step S260 should be executed. According to another embodiment, if the judgment in the step S252 is true, then the steps S222~S232 will be added. At this time, if the judgment in the step S232 is true, then the step S260 will be executed.

The method for testing the display driving circuit according to the second embodiment of the present application is based on the first embodiment of the present application. The second embodiment provides a testing method using multiple data lines. Thereby, the problem of requiring external testing circuits or testers may be solved. In addition, by using multiple data lines to test concurrently, the testing process may be further simplified.

To sum up, the various embodiments of the present application provide several improved methods for testing display driving circuit. By using the data transmitted between the control circuit and the drivers, built-in self-tests may be performed and the problem of requiring external testing circuits or testers may be solved. Furthermore, the present application provides a testing method using multiple data lines. In addition to solving the problem of requiring external testing circuits or testers, by using multiple data lines to test concurrently, the testing process may be further simplified.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A display driving circuit, comprising:

a control circuit, including a first preset parameter, a second preset parameter, and a first testing module;

a first driver, coupled to said control circuit, receiving at least one of a first voltage level and/or a second voltage level to said first driver from said first test module and returning at least one of a first returned voltage level and/or a second returned voltage level to said first testing module, said first testing module comparing said first returned voltage level with to said first preset parameter while said first test module receives said first returned voltage level, and said first testing module comparing said second returned voltage level with said second preset parameter while said first test module receives said second returned voltage level; and a second driver, coupled to said first testing module and connected in series with said first driver;

where said first testing module transmits an enable signal to said first driver for testing said first driver and said second driver sequentially; and when said first returned voltage level is not equal to said first preset parameter or said second returned voltage level is not equal to said second preset parameter, said control circuit stops testing said second driver, when said first returned voltage level is equal to said first preset parameter and said second returned voltage level is equal to said second preset parameter, said first driver transmits said enable signal to said second driver.

2. The display driving circuit of claim 1, wherein when said first returned voltage level is equal to said first preset parameter and said second returned voltage level is equal to said second preset parameter, said control circuit transmits said first voltage level and said second voltage level to said second driver for testing said second driver.

3. The display driving circuit of claim 1, wherein said control circuit outputs said first voltage level and said voltage via a first data line at different times to said first driver; and said first driver returns said first returned voltage level and said second returned voltage level to said control circuit via said first data line at different times.

4. The display driving circuit of claim 3, wherein said control circuit includes a control counter; said control counter increases a first counting value by one when said first returned voltage level is equal to said first preset parameter and said second returned voltage level is equal to said second preset parameter; when said first counting value is equal to N, said control circuit ends testing; when said first counting value is not equal to N, said control circuit stops testing and generates an abnormal signal; and N represents the total number of drivers.

5. The display driving circuit of claim 3, wherein said first driver includes a driving counter; said driving counter counts a second counting value according to said enable signal; when said second counting value is one, said first driver returns said first returned voltage level to said control circuit; when said second counting value is two, said first driver returns said second returned voltage level to said control circuit; and when said second counting value is three, said first driver transmits said enable signal to said second driver.

6. The display driving circuit of claim 1, wherein said first testing module generates said enable signal to said first driver according to a clock signal; said first driver and said second driver include an enable input node and an enable output node, respectively; said enable input node of said first driver is coupled to said control circuit; said enable input node of said second driver is coupled to said enable output node of said first driver; and when said first returned voltage level is equal to said first present parameter and said second returned voltage level is equal to said second preset parameter, said enable output node of said first driver outputs said enable signal to said enable input node of said second driver.

7. The display driving circuit of claim 1, wherein said control circuit includes a panel testing model control element; said panel testing model control element generates a start signal according to a testing command to a panel testing model driving unit of said first driver; said panel testing model driving unit drives said first driver according to said start signal to perform self-tests according to said enable signal, said first voltage level, and said second voltage level and generate said first returned voltage level and second returned voltage level correspondingly.

8. The display driving circuit of claim 1, wherein said control circuit outputs said first voltage level and a third voltage level at different time via a first data line and said second voltage level and a fourth voltage level at different times via a second data line to said first driver; said first driver returns said first returned voltage level a third returned voltage level at different times via said first data line and said second returned voltage level and a fourth returned voltage level at different times via said second data line to said control circuit.

9. The display driving circuit of claim 8, wherein said first driver includes a driving counter; said driving counter counts a second counting value according to said enable signal; when said second counting value is one, said first driver returns said first returned voltage level and said second returned voltage level to said control circuit; when said second counting value is two, said first driver returns said third returned voltage level and said fourth voltage level to said control circuit; and when said second counting value is three, said first driver transmits said enable signal to said second driver.

10. A method for testing a plurality of drivers connected in series, applied to a control circuit for testing a first driver and a second driver of said drivers sequentially, said first driver connected in series with said second driver, said control circuit transmitting an enable signal to said first driver for testing said first driver and said second driver sequentially, and comprising steps of:

said control circuit transmitting a first voltage level to said first driver for testing and returning a first returned voltage level to said control circuit while said control circuit comparing said first returned voltage level with a first preset parameter; and said control circuit transmitting a second voltage level to said first driver for testing and returning a second returned voltage level to said control circuit while said control circuit comparing said second returned voltage level with a second preset parameter;

wherein when said first returned voltage level is not equal to said first preset parameter or said second returned voltage level is not equal to said second preset parameter, said control circuit stops testing said second driver, when said first returned voltage level is equal to said first preset parameter and said second returned voltage level is equal to said second preset parameter, said first driver transmits said enable signal to said second driver.

11. The method for testing a plurality of drivers connected in series of claim 10, applied to said control circuit for testing said first driver and said second driver of said drivers sequentially, said first driver connected in series with said second driver, said control circuit transmitting an enable signal to said first driver for testing said first driver and said second driver sequentially, wherein when said first returned voltage level is equal to said first preset parameter and said second returned voltage level is equal to said second preset parameter, said second driver repeats the testing steps of said first driver.

12. The method for testing a plurality of drivers connected in series of claim 10, applied to said control circuit for testing said first driver and said second driver of said drivers sequentially, said first driver connected in series with said second driver, said control circuit transmitting an enable signal to said first driver for testing said first driver and said second driver sequentially, wherein said step of said control circuit transmitting said first voltage level to test said first driver for returning said first returned voltage level to said control circuit, and said control circuit comparing said first returned voltage level of said first driver according to said first preset parameter; and said control circuit transmitting said second voltage level to test said first driver for returning said second returned voltage level to said control circuit, and said control circuit comparing said second returned voltage level of said first driver according to said second preset parameter further includes steps of:

said control circuit transmitting said first voltage level to said first driver via a first data line;

said first driver returning said first returned voltage level to said control circuit via said first data line;

said control circuit comparing if said first returned voltage level equal to said first preset parameter;

when said first returned voltage level is equal to said first preset parameter, said control circuit transmitting said second voltage level to said first driver via said first data line;

said first driver returning said second returned voltage level to said control circuit via said first data line; and said control circuit comparing if said second returned voltage level equal to said second preset parameter;

where when said first returned voltage level is not equal to said first preset parameter or said second returned voltage level is not equal to said second preset parameter, said control circuit stops testing.

13. The method for testing a plurality of drivers connected in series of claim 12, applied to said control circuit for testing said first driver and said second driver of said drivers sequentially, said first driver connected in series with said second driver, said control circuit transmitting an enable signal to said first driver for testing said first driver and said second driver sequentially, wherein when said first returned voltage level is equal to said first preset parameter and said second returned voltage level is equal to said second preset parameter, said first driver transmits said enable signal to said second driver, and said control circuit and said second driver repeat the testing steps of said control circuit and said first driver.

14. The method for testing a plurality of drivers connected in series of claim 12, applied to said control circuit for testing said first driver and said second driver of said drivers sequentially, said first driver connected in series with said second driver, said control circuit transmitting an enable signal to said first driver for testing said first driver and said second driver sequentially, wherein a control counter of said control circuit counts a counting value and further including the following step of: when said first counting value is equal to N, said control circuit ends testing; and when said first counting value is not equal to N, said control circuit stops testing and generates an abnormal signal.

15. The method for testing a plurality of drivers connected in series of claim 14, applied to said control circuit for testing said first driver and said second driver of said drivers sequentially, said first driver connected in series with said second driver, said control circuit transmitting an enable signal to said first driver for testing said first driver and said second driver sequentially, wherein said first driver includes a driving counter; said driving counter counts a second counting value according to said enable signal; when said second counting value is one, said first driver returns said first returned voltage level to said control circuit; when said second counting value is two, said first driver returns said second returned voltage level to said control circuit; and when said second counting value is three, said first driver transmits said enable signal to said second driver.

16. The method for testing a plurality of drivers connected in series of claim 10, applied to said control circuit for testing said first driver and said second driver of said drivers sequentially, said first driver connected in series with said second driver, said control circuit transmitting an enable signal to said first driver for testing said first driver and said second driver sequentially, wherein said step of said control circuit transmitting said first voltage level to test said first driver for returning said first returned voltage level to said control circuit, and said control circuit comparing said first returned voltage level of said first driver according to said first preset parameter; and said control circuit transmitting said second voltage level to test said first driver for returning said second returned voltage level to said control circuit, and said control circuit comparing said second returned voltage level of said first driver according to said second preset parameter further includes steps of:

said control circuit transmitting said first voltage level to said first driver via a first data line and said second voltage level to said first driver via a second data line;

said first driver returning said first returned voltage level to said control circuit via said first data line and said second returned voltage level to said control circuit via said second data line;

said control circuit comparing if said first returned voltage level equal to said first preset parameter and if said second returned voltage level equal to said second preset parameter;

when said first returned voltage level is equal to said first preset parameter and said second returned voltage level is equal to said second preset parameter, said control circuit transmitting a third voltage level via said first data line and a fourth voltage level via said second data line to said first driver;

said first driver returning said third returned voltage level to said control circuit via said first data line and said fourth returned voltage level to said control circuit via said second data line; and said control circuit comparing if said third returned voltage level equal to said third preset parameter and if said fourth returned voltage level equal to said fourth preset parameter;

where when said first returned voltage level is not equal to said first preset parameter or said second returned voltage level is not equal to said second preset parameter or said third returned voltage level is not equal to said third preset parameter or said fourth returned voltage level is not equal to said fourth preset parameter, said control circuit stops testing said second driver.

17. The method for testing a plurality of drivers connected in series of claim 16, applied to said control circuit for testing said first driver and said second driver of said drivers sequentially, said first driver connected in series with said second driver, said control circuit transmitting an enable signal to said first driver for testing said first driver and said second driver sequentially, wherein when said first returned voltage level is equal to said first preset parameter, said second returned voltage level is equal to said second preset parameter, said third returned voltage level is equal to said third preset parameter, and said fourth returned voltage level is equal to said fourth preset parameter, said first driver transmits said enable signal to said second driver, and said control circuit and said second driver repeat said testing steps for said control circuit and said first driver.

18. The method for testing a plurality of drivers connected in series of claim 16, applied to said control circuit for testing said first driver and said second driver of said drivers sequentially, said first driver connected in series with said second driver, said control circuit transmitting an enable signal to said first driver for testing said first driver and said second driver sequentially, wherein said first driver includes a driving counter, said driving counter counts a second counting value according to said enable signal; when said second counting value is one, said first driver returns said first returned voltage level and said second returned voltage level to said control circuit; when said second counting value is two, said first driver returns said third returned voltage level and said fourth voltage level to said control circuit; and when said second counting value is three, said first driver transmits said enable signal to said second driver.

19. The method for testing a plurality of drivers connected in series of claim 10, applied to said control circuit for testing said first driver and said second driver of said drivers sequentially, said first driver connected in series with said second driver, said control circuit transmitting an enable signal to said first driver for testing said first driver and said second driver sequentially, further comprising the following steps of:

said control circuit transmitting a start signal to said first driver;

where said control circuit further generates said start signal according to a testing command; and said first driver receives said start signal and performs tests according to said start signal.

* * * * *